United States Patent
Tsai et al.

(10) Patent No.: US 11,650,164 B2
(45) Date of Patent: May 16, 2023

(54) ARTIFICIAL NEURAL NETWORK-BASED METHOD FOR SELECTING SURFACE TYPE OF OBJECT

(71) Applicant: GETAC TECHNOLOGY CORPORATION, Hsinchu County (TW)

(72) Inventors: Kun-Yu Tsai, Taipei (TW); Po-Yu Yang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 344 days.

(21) Appl. No.: 16/848,576

(22) Filed: Apr. 14, 2020

(65) Prior Publication Data
US 2020/0364850 A1  Nov. 19, 2020

Related U.S. Application Data

(60) Provisional application No. 62/848,216, filed on May 15, 2019.

(51) Int. Cl.
| | |
|---|---|
| *G06T 7/00* | (2017.01) |
| *G06T 7/40* | (2017.01) |
| *G06V 20/64* | (2022.01) |
| *G01N 21/88* | (2006.01) |
| *G06T 7/586* | (2017.01) |
| *G06N 3/08* | (2023.01) |
| *G01N 21/3581* | (2014.01) |

(Continued)

(52) U.S. Cl.
CPC ........ *G01N 21/8806* (2013.01); *G01J 3/2823* (2013.01); *G01N 21/01* (2013.01); *G01N 21/3581* (2013.01); *G01N 21/8851* (2013.01); *G01N 21/952* (2013.01); *G01N 21/956* (2013.01); *G06F 17/16* (2013.01); *G06F 18/2148* (2023.01); *G06N 3/04* (2013.01); *G06N 3/047* (2023.01); *G06N 3/063* (2013.01); *G06N 3/08* (2013.01); *G06T 7/0004* (2013.01); *G06T 7/11* (2017.01); *G06T 7/40* (2013.01); *G06T 7/45* (2017.01); *G06T 7/586* (2017.01); *G06T 7/97* (2017.01); *G06V 10/145* (2022.01); *G06V 10/22* (2022.01); *G06V 20/64* (2022.01); *G06V 20/647* (2022.01); *G01N 2021/8887* (2013.01); *G06T 2207/10152* (2013.01); *G06T 2207/20081* (2013.01); *G06T 2207/20084* (2013.01)

(58) Field of Classification Search
CPC ........... G06V 10/60; G06T 7/586; G06T 7/45
See application file for complete search history.

(56) References Cited

U.S. PATENT DOCUMENTS 5,517,235 A * 5/1996 Wasserman .......... G01N 21/956
382/148
9,310,278 B2  4/2016 Sukegawa
(Continued)

*Primary Examiner* — Kevin Ky

(57) ABSTRACT

An artificial neural network-based method for selecting a surface type of an object includes receiving at least one object image, performing surface type identification on each of the at least one object image by using a first predictive model to categorize the object image to one of a first normal group and a first abnormal group, and performing surface type identification on each output image in the first normal group by using a second predictive model to categorize the output image to one of a second normal group and a second abnormal group.

16 Claims, 18 Drawing Sheets

(51) Int. Cl.
*G06N 3/04* (2023.01)
*G06T 7/11* (2017.01)
*G01J 3/28* (2006.01)
*G01N 21/956* (2006.01)
*G06T 7/45* (2017.01)
*G06F 17/16* (2006.01)
*G06N 3/063* (2023.01)
*G01N 21/01* (2006.01)
*G01N 21/952* (2006.01)
*G06V 10/22* (2022.01)
*G06F 18/214* (2023.01)
*G06N 3/047* (2023.01)
*G06V 10/145* (2022.01)

(56) References Cited

U.S. PATENT DOCUMENTS

| | | | |
|---|---|---|---|
| 10,255,085 B1 | 4/2019 | Valsaraj | |
| 10,346,969 B1 | 7/2019 | Raghu | |
| 10,546,236 B2 | 1/2020 | Gruenstein | |
| 10,621,779 B1* | 4/2020 | Topiwala | G06T 7/62 |
| 2003/0023404 A1 | 1/2003 | Moselhi | |
| 2003/0038365 A1* | 2/2003 | Farnworth | H01L 24/83 |
| | | | 324/759.02 |
| 2003/0164942 A1* | 9/2003 | Take | G01N 21/95607 |
| | | | 356/394 |
| 2006/0280348 A1* | 12/2006 | Smith | G06T 7/0012 |
| | | | 382/128 |
| 2006/0580348 | 12/2006 | Smith | |
| 2009/0059761 A1* | 3/2009 | Watanabe | G11B 7/0948 |
| 2009/0080759 A1* | 3/2009 | Bhaskar | G06T 7/001 |
| | | | 382/141 |
| 2009/0245622 A1* | 10/2009 | Janin | G01N 21/952 |
| | | | 382/152 |
| 2010/0291836 A1* | 11/2010 | Bavestrelli | G05B 19/41875 |
| | | | 451/5 |
| 2011/0026804 A1* | 2/2011 | Jahanbin | G06T 7/45 |
| | | | 382/141 |
| 2013/0077838 A1* | 3/2013 | Lamash | G06K 9/00536 |
| | | | 382/128 |
| 2013/0283107 A1* | 10/2013 | Yang | G11B 20/18 |
| | | | 714/54 |
| 2013/0300608 A1 | 11/2013 | Margalef | |
| 2014/0305214 A1* | 10/2014 | Jauriqui | G01N 29/2462 |
| | | | 73/579 |
| 2016/0139977 A1 | 5/2016 | Ashani | |
| 2016/0148079 A1 | 5/2016 | Shen | |
| 2017/0191945 A1 | 7/2017 | Zhang | |
| 2017/0256051 A1* | 9/2017 | Dwivedi | G06T 7/13 |
| 2018/0144216 A1* | 5/2018 | Tsai | G06N 3/045 |
| 2018/0157899 A1 | 6/2018 | Xu | |
| 2018/0250826 A1* | 9/2018 | Jiang | G06F 18/28 |
| 2018/0268257 A1 | 9/2018 | Ren | |
| 2019/0003989 A1* | 1/2019 | Miyazaki | G01N 23/043 |
| 2019/0034762 A1 | 1/2019 | Hashimoto | |
| 2019/0138888 A1 | 5/2019 | Sekiyama | |
| 2019/0221313 A1 | 7/2019 | Rim | |
| 2019/0265172 A1* | 8/2019 | Koseki | G01N 21/8806 |
| 2019/0272631 A1* | 9/2019 | Shemonski | A61B 3/102 |
| 2019/0278994 A1* | 9/2019 | Bumpas | G06N 3/08 |
| 2019/0311186 A1* | 10/2019 | Chen | G06V 10/751 |
| 2019/0318210 A1* | 10/2019 | Sewak | G06F 18/241 |
| 2019/0331608 A1 | 10/2019 | Terasawa | |
| 2019/0347801 A1* | 11/2019 | Ellison | G06T 7/174 |
| 2019/0392363 A1 | 12/2019 | Kohli | |
| 2020/0104650 A1 | 4/2020 | Huang | |
| 2020/0133615 A1* | 4/2020 | Kim | G06V 10/245 |
| 2020/0151591 A1 | 5/2020 | Li | |
| 2020/0167202 A1* | 5/2020 | Huang | G05B 13/0265 |
| 2020/0202527 A1 | 6/2020 | Choi | |
| 2020/0226777 A1* | 7/2020 | Luo | G06T 7/85 |
| 2020/0292462 A1 | 9/2020 | Chen | |
| 2020/0356850 A1 | 11/2020 | Fukuda | |
| 2020/0364501 A1* | 11/2020 | Herz | G06Q 30/06 |
| 2020/0364889 A1 | 11/2020 | Chen | |
| 2021/0004721 A1* | 1/2021 | Ijiri | G06F 18/214 |
| 2021/0049749 A1 | 2/2021 | Machek | |
| 2021/0064927 A1 | 3/2021 | Klucknet | |
| 2021/0117651 A1 | 4/2021 | Kotake | |
| 2021/0182077 A1* | 6/2021 | Chen | G06F 40/58 |
| 2022/0092765 A1* | 3/2022 | Song | B23Q 3/157 |
| 2022/0146320 A1* | 5/2022 | Xie | G01J 5/0025 |

\* cited by examiner

| A01 | A02 | A03 | A04 | A05 | A06 | A07 | A08 | A09 | A10 |
|---|---|---|---|---|---|---|---|---|---|
| A11 | A12 | A13 | A14 | A15 | A16 | A17 | A18 | A19 | A20 |
| A21 | A22 | A23 | A24 | A25 | A26 | A27 | A28 | A29 | A30 |
| A31 | A32 | A33 | A34 | A35 | A36 | A37 | A38 | A39 | A40 |
| A41 | A42 | A43 | A44 | A45 | A46 | A47 | A48 | A49 | A50 |
| A51 | A52 | A53 | A54 | A55 | A56 | A57 | A58 | A59 | A60 |
| A61 | A62 | A63 | A64 | A65 | A66 | A67 | A68 | A69 | A70 |

ARTIFICIAL NEURAL NETWORK-BASED METHOD FOR SELECTING SURFACE TYPE OF OBJECT

CROSS-REFERENCE TO RELATED APPLICATIONS

This application claims priority from U.S. Patent Application Ser. No. 62/848,216, filed on May 15, 2019, the entire disclosure of which is hereby incorporated by reference.

BACKGROUND OF THE INVENTION

Field of the Invention

The present invention relates to an artificial neural network training system and, more particularly, to an artificial neural network-based method for selecting a surface type of an object.

Description of the Prior Art

Various safety protection measures are consisted of numerous small structural objects, such as safety belts. If these small structural objects have insufficient strength, safety concerns of protection effects of safety protection measures can be resulted.

Due to various reasons during a manufacturing process of these structural objects, such as impacts, fabrication errors and mold defects, minute defects such as slots, cracks, bumps and textures can be resulted on surfaces of these structural objects. These minute defects cannot be easily observed. One conventional defect detection method is manually inspecting a structural object under detection by naked eyes or by touching of hands, so as to determine whether the structural object contains defects, such as recesses, scratches, color differences or damages. However, manually inspecting whether a structural object contains defects yields less satisfactory efficiency and is extremely susceptible to misjudgment, leading to the problem of an unmanageable yield rate of the structural object.

SUMMARY OF THE INVENTION

In one embodiment, an artificial neural network-based method for selecting a surface type of an object includes receiving at least one object image, performing surface type identification on each of the at least one object image by using a first predictive model to categorize the object image to one of a first normal group and a first abnormal group, and performing surface type identification on each output image in the first normal group by using a second predictive model to categorize the output image to one of a second normal group and a second abnormal group.

In conclusion, the artificial neural network-based method for selecting a surface type of an object according to the embodiment of the present invention continually performs surface type identification on an object image by using multiple cascaded neural networks of different training conditions so as to accurately and rapidly categorize the image object, and efficiently selects an object corresponding to the object image based on the categorization result of the object image, thereby achieving a lower miss rate.

DETAILED DESCRIPTION OF THE EMBODIMENTS

An artificial neural network-based method for selecting a surface type of an object is suitable for an artificial neural network system. Herein, the artificial neural network system can be implemented on a processor.

In some embodiments, the processor can perform deep learning of multiple sub neural network systems (equivalent to artificial neural networks which have not completed the training) on a plurality of same or different object images by using different training conditions so as to respectively build predictive models (equivalent to artificial neural networks which have completed the training) that the multiple sub neural network systems use for identifying a surface type of an object, and cascade the sub neural network systems into an artificial neural network system. Herein, the object images can be images of surfaces at the same relative positions of a same type of objects. In other words, if a surface of an object contains any surface type, an image of the surface type is also formed at a corresponding image position in the object image of the object. Furthermore, the artificial neural network system receives a plurality of object images by using fixed imaging coordinate parameters. For example, if the surface of an object has a sand hole, this sand hole is also imaged at a corresponding image position in the object image of the object. If the surface of an object has a bump mark, this bump mark is also imaged at a corresponding image position in the object image of the object. In some embodiments, the surface type is, for example, surface structures such as slots, cracks, bumps, sand holes, air holes, bump marks, scratches, edges and textures. Wherein, the surface type is a three-dimensional fine structure. Herein, the three-dimensional fine structure is in a scale of submicron to micron (μm); that is, the longest side or the longest diameter of the three-dimensional fine structure is in a scale between submicron and micron. Wherein, submicron refers to <1 μm, e.g., 0.1 μm to 1 μm. For example, the three-dimensional fine structure is a micro-structure of 300 nm to 6 μm.

Figure 1:
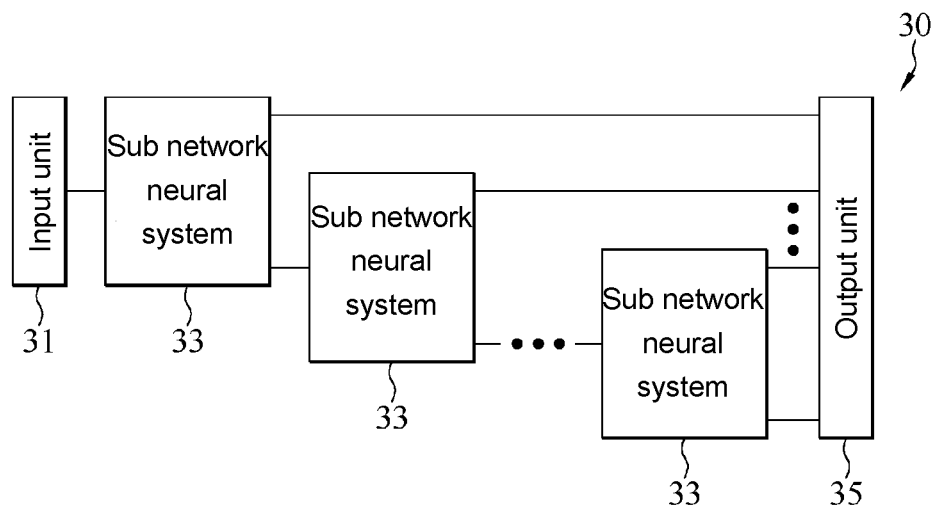
FIG. 1 is a schematic diagram of an artificial neural network system according to an embodiment of the present invention.

Referring to FIG. 1, the artificial neural network system 30 can include an input unit 31, multiple sub neural network systems 33 and an output unit 35. The sub neural network systems 33 are cascaded between the input output 31 and the output unit 35, and each sub neural network system 33 has a part of an output thereof connected in series to the sub neural network system 33 of the next stage. Each sub neural network system 33 includes a predictive model.

In some embodiments, the output of each neural network system 33 can be divided into a normal group and an abnormal group, and the normal group of each sub neural network system 33 is coupled to the input of the sub neural network system 33 of the next stage. For example, in the prediction phase, upon feeding one or more object images IM to the artificial neural network system 30, the first-stage sub neural network system 33 executes the predictive model on each of the object images IM to categorize the object images IM to a first-stage normal group or a first-stage abnormal group. If the object images IM are categorized to the first-stage normal group, the object images IM outputted to the first-stage normal group by the first-stage sub neural network system 33 are subsequently fed to the second-stage sub neural network system 33, such that the second-stage sub neural network system 33 continues to execute the predictive model on the object images IM so as to categorize the object images IM to a second-stage normal group or a second-stage abnormal group. Conversely, if the object images IM are categorized to the first-stage abnormal group, the object images IM outputted to the first-stage normal group by the first-stage sub neural network system 33 are not fed to the second-stage sub neural network system 33. The above steps are similarly repeated, until the last-stage sub neural network system 33 executes the predictive model on the object images IM fed in by the previous stage (equivalent to the object images IM categorized to the normal group of the previous-stage sub neural network system 33).

In some embodiments, the output unit 35 receives the abnormal groups outputted by all the sub neural network systems 33 and accordingly outputs an abnormal result, and the output unit 35 further receives the normal group outputted by the last-stage sub neural network system 33 and accordingly outputs a normal result.

Figure 2:
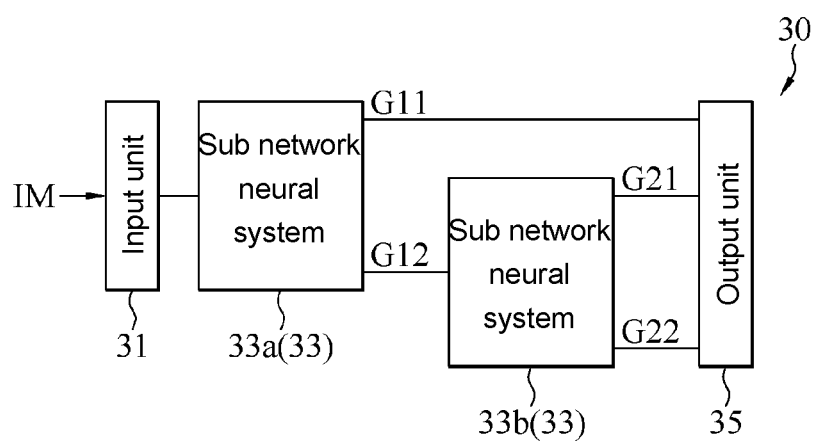
FIG. 2 is a schematic diagram of an artificial neural network system according to another embodiment of the present invention.

For illustration purposes, two sub neural network systems 33 are taken as an example; however, the exemplary quantity is not to be construed as a limitation to the present invention. Referring to FIG. 2, the two sub neural network systems 33 are respectively referred to as a first sub neural network system 33a and a second sub neural network system 33b.

The input of the first sub neural network system 33a is coupled to the input unit 31. A part of the output of the first sub neural network system 33a is coupled to the input of the second sub neural network system 33b, and the other part of the output of the first sub neural network system 33a is coupled to the output unit 35.

Herein, the first sub neural network system 33a has a first predictive model, and the second sub neural network system 33b has a second predictive model. In some embodiments, the first predictive model can be implemented by a convolutional neural network (CNN) algorithm, and the second predictive model can also be implemented by a CNN algorithm. However, the present invention is not limited to the above example.

Figure 3:
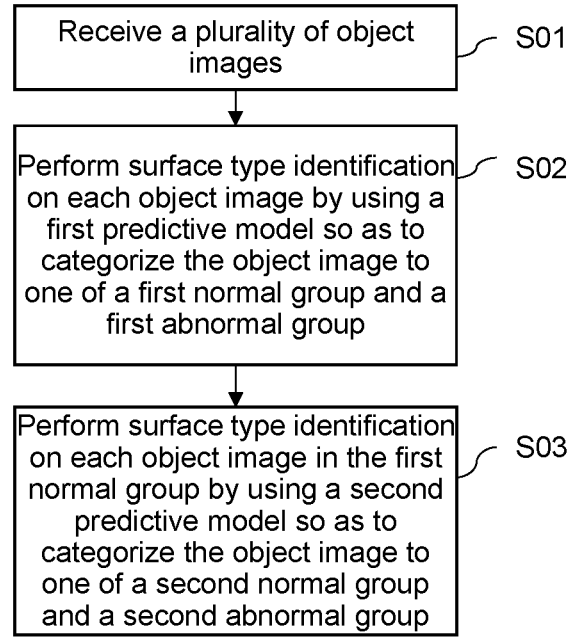
FIG. 3 is a flowchart of an artificial neural network-based method for selecting a surface type of an object according to an embodiment of the present invention.

Herein, referring to FIG. 2 and FIG. 3, the input unit 31 receives one or multiple object images IM (step S01), and feeds the object image(s) IM received to the first sub neural network system 33a. Next, the first predictive model of the first sub neural network system 33a performs surface type identification on each of the object image(s) IM to categorize the object image IM to one of a first normal group G12 and a first abnormal group G11 (step S02). In other words, the first predictive model will categorize, after identifying the surface type imaged in each object image IM, the object image IM to the first normal group G12 or the first abnormal group G11 according to the identification result.

Then, the object image IM categorized to the first normal group G12 is fed to the second sub neural network system 33b, and the second predictive model of the second sub neural network system 33b performs surface type identification so as to categorize the object image IM to one of a second normal group G22 and a second abnormal group G21 (step S03). In other words, the second predictive model identifies the surface type imaged in the object image IM belonging to the first normal group G12, and then categorizes the object image IM to the second normal group G22 or the second abnormal group G21 according to the identification result.

Finally, the output unit 35 receives the first abnormal group G11 outputted from the first predictive model, the second abnormal group G21 outputted from the second predictive model, and the second normal group G22 outputted from the second predictive model, and outputs an abnormal result and a normal result. The abnormal result includes the object image IM categorized to the first abnormal group G11 and the object image IM categorized to the second abnormal group G21. The normal result includes the object image IM categorized to the second normal group G22.

In some embodiments, the predictive model of individual sub neural network systems 33 can be implemented by a convolutional neural network (CNN) algorithm; however, the present invention is not limited to the example.

In some embodiments, the sub neural network systems 33 perform deep learning by using different training conditions to build respective predictive models. The training conditions can be, for example, different numbers of neural network layers, different neuron configurations, different pre-processing processes of input images, different neural network algorithms, or any combination thereof. The pre-processing of images can be feature enhancement, image cropping, data format conversion, image superimposition, or any combination thereof.

In some embodiments, the number of neural networks cascaded in the artificial neural network system 30 can be two neural networks, three neural networks, four neural networks, or even more neural networks cascaded according to actual requirements.

In some embodiments, the sub neural network systems 33 can have different determination defect rates. In some embodiments, the processor can cascade multiple sub neural network systems 33 according to the determination defect rates of the predictive models of the multiple sub neural network systems 33 into one artificial neural network system 30. For example, the sub neural network system 33 having a higher determination defect rate is arranged in the front, and the sub neural network system 33 having a lower determination defect rate is arranged at the back. In other words, the determination defect rates of the multiple sub neural network systems 33 cascaded decrease sequentially. On this basis, the artificial neural network system 30 is capable of rapidly performing categorization prediction on a large number of objects under detection, while satisfying an improved miss rate.

In some embodiments, at least one of the sub neural network systems 33 can perform image pre-processing of image cropping.

Figure 4:
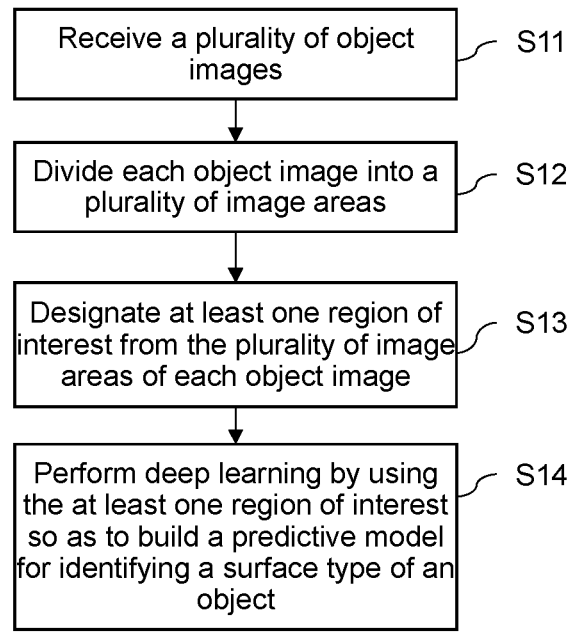
FIG. 4 is a flowchart of a training method of a sub neural network system according to an embodiment of the present invention.

Referring to FIG. 4, in the learning phase, the sub neural network system 33 receives a plurality of object images IM (step S11). Herein, the object images can be images of surfaces at the same relative positions of a same type of objects. Next, the sub neural network system 33 divides each object image IM into a plurality of image areas (step S12), and designates at least one region of interest from the plurality of image areas of each of the object images IM (step S13). In other words, after one object image IM is cut into a plurality of image areas, the sub neural network system 33 can designate, according to a designation setting, an image area of a corresponding sequence among the plurality of image areas as a region of interest. Then, the sub neural network system 33 performs deep learning (training) by using the designated region of interest so as to build a predictive model for identifying a surface type of the object (step S14). In some embodiments, the sub neural network system 33 is capable of performing division, designation and training of the images one after another. In some other embodiments, the sub neural network system 33 is capable of performing division and designation of each object image first, and then performing training collectively by using all the designated regions of interest.

Figures 5, 6:
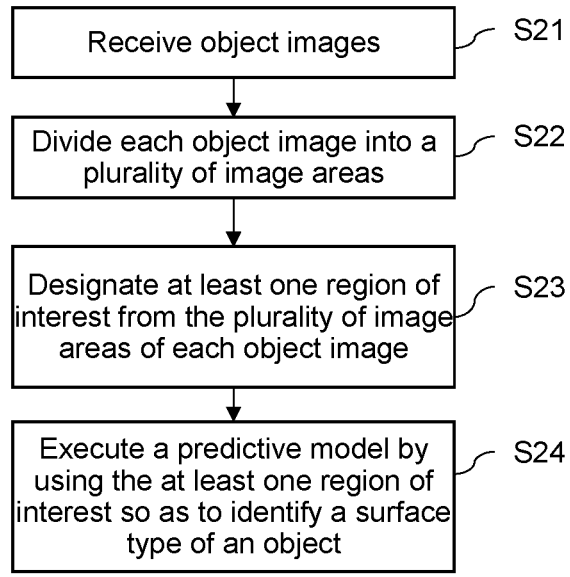
FIG. 5 is a flowchart of a detection method of a sub neural network system according to an embodiment of the present invention.
FIG. 6 is a schematic diagram of an exemplary image area.

In a prediction phase, the sub neural network system 33 performs categorization prediction by using steps substantially the same as those in the learning phase. Referring to FIG. 5, the sub neural network system 33 receives one or multiple object images IM (step S21). Herein, the imaging target and imaging position of each of the object image(s) IM are the same as the imaging target and imaging position of the object images IM used in the learning phase (for example, the same relative positions of the same type of objects). Next, the sub neural network system 33 divides each object image IM into a plurality of image areas (step S22), and designates at least one region of interest from the plurality of image areas of each object image IM (step S23). In other words, after one object image IM is cut into a plurality of image areas, the sub neural network system 33 can designate, according to a designation setting, an image area of a corresponding sequence among the plurality of image areas as a region of interest. Then, the sub neural network system 33 executes the predictive model by using the designated region of interest so as to identify the surface type of the object (step S24).

On this basis, the neural network system 33 is capable of flexibly introducing a detection result of a specific region (the designated region of interest). In some embodiments, the neural network system 33 is capable of obtaining a lower miss rate, for example, a missing rate approximating zero.

In some embodiments, the number of divided image areas of each object image IM is any integer more than 2. Preferably, the image size of each image area can be less than or equal to 768*768 pixels, for example, 400*400 pixels, 416*416 pixels, or 608*608 pixels. Furthermore, the image sizes of the image areas are the same. In some embodiments, each image area is preferably a square. For example, assuming the image size of the object image IM is 3,000*4,000 pixels, the image size of the image areas after cutting can be 200*200 pixels.

In some embodiments of step S12 and step S22, the sub neural network system 33 can first enlarge the object image IM according to a predetermined cutting size, such that the size of the object image IM is an integer multiple of the size of the image area. Then, the sub neural network system 33 cuts the enlarged object image IM into multiple image areas according to the predetermined cutting size. Herein, the image sizes of the individual image areas are the same, that is, equivalent to the predetermined cutting size.

For example, referring to FIG. 6, the sub neural network system 33 individually divides each object image IM received into 70 image areas A01 to A70 by a same cutting size. Then, the sub neural network system 33 designates the image areas A01 to A10 as regions of interest according to a predetermined designation setting (assuming that the designation setting is 1 to 10), so as to further perform deep learning or execute a predictive model by using the image areas A01 to A10 (i.e., the regions of interest).

In some embodiments, the region of interest can be, for example, an image area imaged from an area with sand holes of different depths, an image area imaged from an area without sand holes but having bump marks or scratches, an image area imaged from an area with different levels of surface roughness, an image area imaged from an area without surface defects, or an image area imaged from an area with defects of different aspect ratios. Herein, the sub neural network system 33 performs deep learning or executes the predictive model according to the regions of interest of said different surface types. In the learning phase, the sub neural network system 33 can categorize regions of interest of different surface types so as to generate different predetermined surface type categories in advance.

For example, the sub neural network system 33 can use the regions of interest to identify that, sand holes and bump marks are imaged in the region of interest A01, no defects are imaged in the region of interest A02, only sand holes are imaged in the region of interest A33 and the level of surface roughness thereof is less than the level of surface roughness of the region of interest A35. In the prediction phase, taking five categories as predetermined surface type categories for example, namely, having sand holes or air holes, having scratches or bump marks, having a high level of surface roughness, having a low level of surface roughness, and without any surface defects, the sub neural network system 33 can categorize the region of interest A01 to the predetermined category of having sand holes or air holes and the predetermined category of having scratches or bump marks, categorize the region of interest A02 to the predetermined category of being without any surface defects, categorize the region of interest A33 to the predetermined category of having sand holes or air holes and the predetermined category of having a low level of surface roughness, and categorize the region of interest A35 to the predetermined category of having a high level of surface roughness.

In one embodiment of step S13 and step S23, for each object image IM, the sub neural network system 33 designates a region of interest by changing the weighting of each image area. For instance, in continuation of the example above, referring to FIG. 6, after the object image IM is cut into multiple image areas A01 to A70, weightings of the multiple image areas A01 to A70 are initially set to 1. In one embodiment, assuming that the designation setting is 1 to 5, 33 to 38 and 66 to 70, the sub neural network system 33 increases the weightings of the image areas A1 to A5, A33 to A38 and A66 to A70 to 2 according to the predetermined designation setting, thereby designating the image areas A1 to A5, A33 to A38 and A66 to A70 as regions of interest. In one example, when the weightings of the regions of interest are increased, the weightings of the other image areas A6 to A32 and A39 to A65 can be kept at 1. In another example, when the weightings of the regions of interest are increased, the sub neural network system 33 can at the same time decrease the weightings of the other image areas A6 to A32 and A39 to A65 to 0.

In another embodiment, assuming that the designation setting is 1 to 5, 33 to 38 and 66 to 70, the artificial neural network system 30 decreases the weightings of the image areas A6 to A32 and A39 to A65 other than the image areas A1 to A5, A33 to A38 and A66 to A70 to 0 or 0.5 according to the predetermined designation setting, and keeps the weightings of the image areas A1 to A5, A33 to A38 and A66 to A70 at 1, thereby designating the image areas A1 to A5, A33 to A38 and A66 to A70 as regions of interest.

In one embodiment, the sub neural network system 33 can include a pre-processing unit and a deep learning unit. The input of the pre-processing unit is coupled to a previous stage of the current sub neural network system 33 (the previous sub neural network system 33 or input unit 31), and the output of the pre-processing unit is coupled to the input of the deep learning unit. The output of the deep learning unit is coupled to the next stage of the current sub neural network system 33 (the next sub neural network system 33 or output unit 35). Herein, the pre-processing unit is for performing step S11 to step S13 or step S21 to step S23, and the deep learning unit is for performing step S14 or step S24. In other words, the deep learning unit becomes the predictive model upon having performed deep learning. In another embodiment, the deep learning unit can include an input layer and multiple layers of hidden layers. The input layer is coupled between the previous stage (the previous sub neural network system 33 or input unit 31) and the hidden layers. Each hidden layer is coupled between the input layer and the next stage (the next sub neural network system 33 or output unit 35). Herein, step S11 to S13 or step S21 to step S23 can be performed by the input layer instead.

In some embodiments, at least one of the sub neural network systems 33 can perform image pre-processing of data format conversion.

Figure 7:
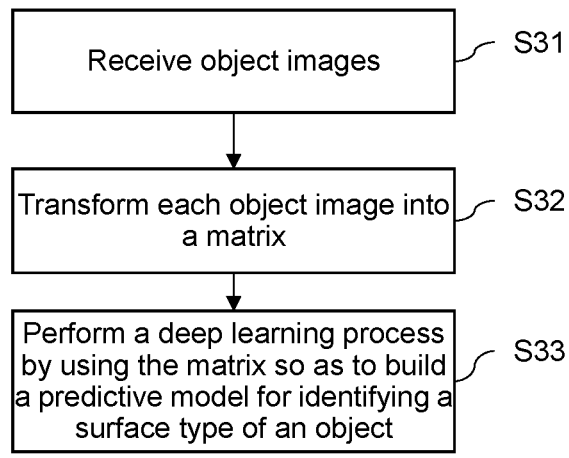
FIG. 7 is a flowchart of a training method of a sub neural network system according to another embodiment of the present invention.

Referring to FIG. 7, in the learning phase, the sub neural network system 33 receives a plurality of object images IM (step S31). Next, the sub neural network system 33 transforms the object image IM into a matrix according to the color mode of the object image IM (step S32), that is, converting the data format of the object image to a format (i.e., an image matrix) supported by an input channel of an artificial neural network. Then, the sub neural network system 33 performs deep learning by using the matrix so as to build a predictive model for identifying a surface type of an object (step S33).

Herein, the object images IM received are all images of surfaces at the same relative positions of the same type of objects. The object images IM received have a plurality of color modes, and each object image IM has one of the color modes. In some embodiments, the color modes can include a plurality of spectra different from one another. For example, in the learning phase, the processor can feed in a large amount of object images IM to the sub neural network system 33. The object images IM fed in include surface images (i.e., object images IM) of different spectra at the same relative positions of each object 2 of the same type of objects 2.

Herein, the artificial neural network in the sub neural network system 33 includes a plurality of image matrix input channels for inputting corresponding matrices, and the image matrix input channels respectively represent a plurality of imaging conditions (e.g., respectively representing a plurality of color modes). That is to say, the sub neural network system 33 converts the object images IM of various different color modes to information such as length, width, pixel type, pixel depth and quantity of channels in the matrix, wherein the quantity of channels represent an imaging condition corresponding to the object images. In addition, the transformed matrix is imported to the corresponding image matrix input channel according to the color mode of the object image, so as to facilitate deep learning. In some embodiments, the image matrix input channels respectively represent a plurality of spectra different from one another.

In some embodiments, the plurality of spectra can range between 380 nm and 3,000 nm. For example, the plurality of spectra different from one another can be any multiple types of the visible light such as white light, violet light, blue light, green light, yellow light, orange light and red light. In one embodiment, the light wavelength of white light ranges between 380 nm and 780 nm, the light wavelength of violet light ranges between 380 nm and 450 nm, the light wavelength of blue light ranges between 450 nm and 495 nm, the light wavelength of green light ranges between 495 nm and 570 nm, the light wavelength of yellow light ranges between 570 nm and 590 nm, the light wavelength of orange light ranges between 590 nm and 620 nm, and the light wavelength of red light ranges between 620 nm and 780 nm. In another example, the spectrum can also be far infrared light having a light wavelength ranging between 800 nm and 3,000 nm.

In some embodiments, the color modes can further include a grayscale mode. At this point, the object image IM is first transformed into a grayscale image, and then transformed into a matrix having the number of channels representing grayscale.

Figure 8:
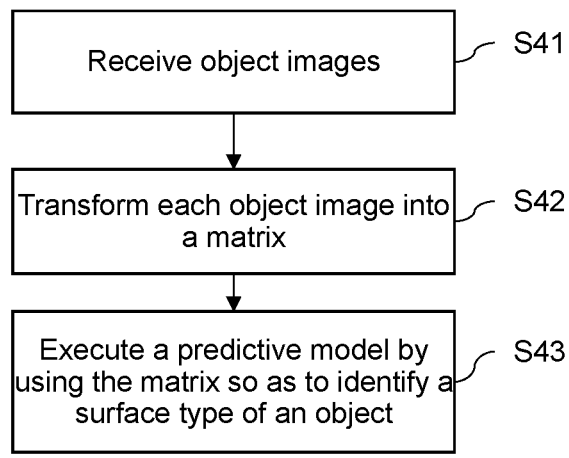
FIG. 8 is a flowchart of a detection method of a sub neural network system according to another embodiment of the present invention.

In a prediction phase, the sub neural network system 33 performs categorization prediction by using steps substantially the same as those in the learning phase. Referring to FIG. 8, the sub neural network system 33 receives one or more object images IM (step S41). Herein, the object images IM are images of surfaces at same relative positions of the same type of objects, and each has a specific color mode. Next, the sub neural network system 33 transforms the object image IM into a matrix according to the color mode of the object image IM (step S42). Then, the sub neural network system 33 executes a predictive model by using the matrix so as to identify a surface type of the object (step S43).

In some embodiments, the sub neural network system 33 can first normalize the object image IM, thus reducing asymmetry between learning data and at the same time enhancing learning efficiency. Then, the sub neural network system 33 transforms the normalized object image IM into a matrix.

On this basis, the sub neural network system 33 performs deep learning by a matrix having the number of channels representing different color modes, such that the predictive model built is capable of identifying information such as a structure type and surface texture (i.e., a surface type) on the surface 21 of the object 2. In other words, by controlling a light emitting spectrum or a light receiving spectrum to provide object images with different imaging effects of the same object, differentiation of the sub neural network system 33 with respect to various target surface types can be enhanced. In some embodiments, the sub neural network system 33 can integrate images of multi-spectrum surface textures, so as to improve identification for a target surface type of an object, thereby further obtaining surface roughness and fine texture patterns of the object.

In one embodiment, the sub neural network system 33 can include a pre-processing unit and a deep learning unit. The input of the pre-processing unit is coupled to a previous stage of the current sub neural network system 33 (the previous sub neural network system 33 or input unit 31), and the output of the pre-processing unit is coupled to the input of the deep learning unit. The output of the deep learning unit is coupled to the next stage of the current sub neural network system 33 (the next sub neural network system 33 or output unit 35). Herein, the pre-processing unit is for performing step S31 and step S32 or step S41 and step S42, and the deep learning unit is for performing step S33 or step S43. In other words, the deep learning unit becomes the predictive model upon having performed deep learning. In another embodiment, the deep learning unit can include an input layer and multiple layers of hidden layers. The input layer is coupled between the previous stage (the previous sub neural network system 33 or input unit 31) and the hidden layers. Each hidden layer is coupled between the input layer and the next stage (the next sub neural network system 33 or output unit 35). Herein, step S31 and step S32 or step S41 and step S42 can be performed by the input layer instead.

In some embodiments, at least one of the sub neural network systems 33 can perform image pre-processing of image superimposition.

Figure 9:
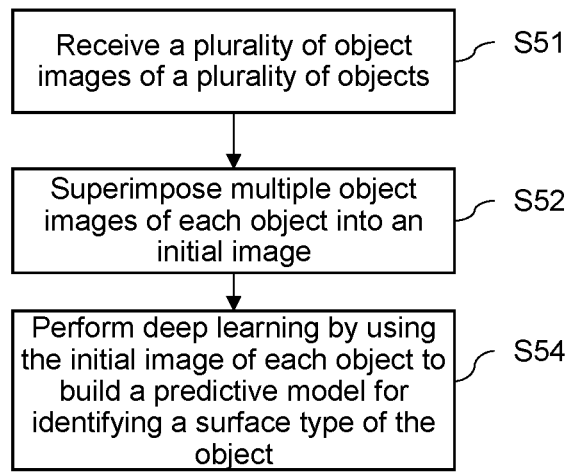
FIG. 9 is a flowchart of a training method of a sub neural network system according to yet another embodiment of the present invention.

In one embodiment, referring to FIG. 9, in the learning phase, the sub neural network system 33 receives a plurality of object images IM of a plurality of objects (step S51). These object images IM are images of surfaces at the same relative positions of the same type of objects. The plurality of object images IM of the same object are obtained based on images of the object captured by light from different lighting directions. In one example, the images of the same object captured can have the same spectrum or can have multiple different spectra. Next, the sub neural network system 33 superimposes the multiple object images IM of each of the objects into a superimposed object image (to be referred to as an initial image hereinafter) (step S52). Then, the sub neural network system 33 performs deep learning by using the initial images of the objects to build a predictive model for identifying a surface type of an object (step S54). For example, the object images IM received include multiple object images IM of a first object and multiple object images IM of a second object. The sub neural network system 33 superimposes the multiple object images IM of the first object into an initial image of the first object, and superimposes the multiple object images IM of the second object into an initial image of the second object, and then performs deep learning by using the initial image of the first object and the initial image of the second object.

Figure 10:
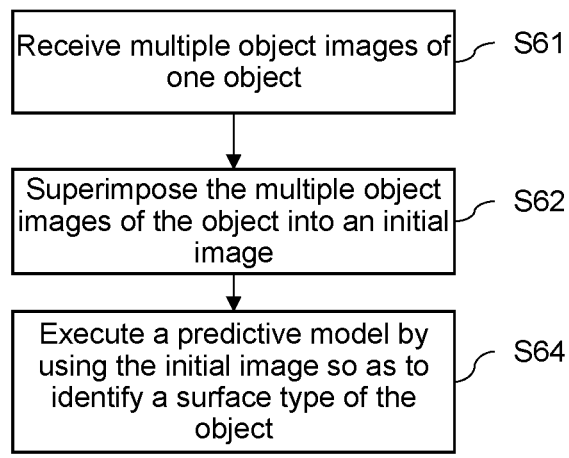
FIG. 10 is a flowchart of a detection method of a sub neural network system according to yet another embodiment of the present invention.

In a prediction phase, the current sub neural network system 33 performs categorization prediction by using steps substantially the same as those in the learning phase. Referring to FIG. 10, the sub neural network system 33 receives multiple object images IM of an object (step S61). Herein, the multiple object images IM of the object are images of a surface at the same position of the object. Furthermore, the multiple object images IM of the object are images of the object captured based on light from different lighting directions. Next, the sub neural network system 33 superimposes the multiple object images IM of the object into an initial image (step S62). Then, the sub neural network system 33 executes a predictive model by using the initial image to identify a surface type of the object (step S64).

On this basis, the sub neural network system 33 can perform training by using multi-angle imaging (i.e., different lighting directions) collaborating with pre-processing of multi-dimensional superimposition, so as to enhance identification for stereoscopic structural features of an object, given that the computation time is not increased. In other words, by controlling various different incident angles of an imaging light source, the same object is provided with object images having different imaging effects, thereby enhancing the spatial stereoscopic differentiation of the sub neural network system 33 with respect to various surface types of an object. Furthermore, by integrating object images under different lighting directions, multi-dimensional superimposition is performed on the object images, so as to enhance identification of the sub neural network system 33 with respect to surface types of an object, thereby obtaining an optimal resolution of surface types of an object.

Figure 11:
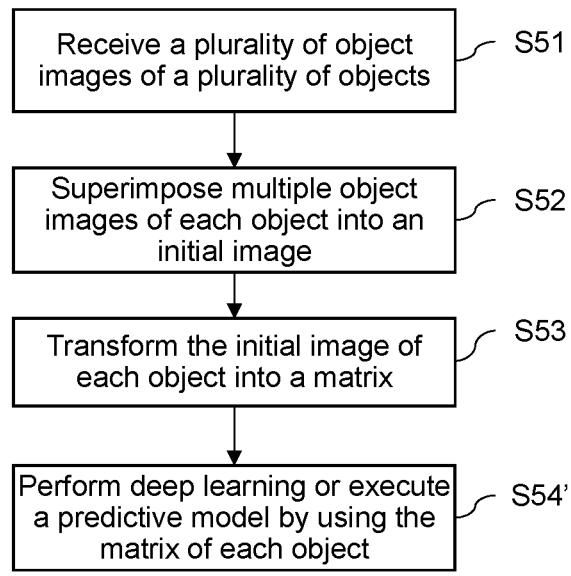
FIG. 11 is a flowchart of a training method of a sub neural network system according to a further embodiment of the present invention.
Figure 12:
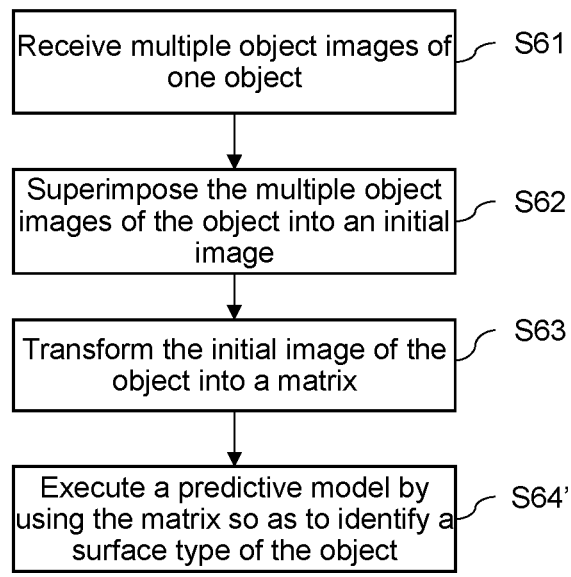
FIG. 12 is a flowchart of a detection method of a sub neural network according to a further embodiment of the present invention.

In another embodiment, referring to FIG. 11 and FIG. 12, after step S52 or S62, the sub neural network system 33 can first transform the initial image of each object into a matrix (step S53 or S63); that is, the data format of the initial image of each object is transformed into a format (e.g., an image matrix) supported by the input channel of an artificial neural network. Then, the sub neural network system 33 performs deep learning or executes the predictive model by using the matrix of each object (step S54' or S64'). That is to say, the sub neural network system 33 converts the initial image of each object into information such as length, width, pixel type, pixel depth and quantity of channels in the matrix, wherein the quantity of channels represents a color mode corresponding to the initial image. Furthermore, the transformed matrix is imported to the corresponding image matrix input channel according to the color mode of the initial image, so as to facilitate subsequent processing.

In an example of step S52 (or step S62), the sub neural network system 33 first normalizes the object images IM received, and then superimposes the normalized object images IM of the same object into the initial image. Thus, asymmetry between learning data is reduced and learning efficiency is enhanced.

In one example of step S51 (or step S61), the object images IM of the same object can have the same spectrum. In another example of step S51 (or step S61), the object images IM of the same object can have a plurality of different spectra. That is to say, the multiple object images IM of the same object includes an image of the object captured based on a spectrum of different lighting directions and an image of the object captured based on another spectrum of different lighting directions. Furthermore, the two spectra are different from each other.

In one embodiment, the sub neural network system 33 can include a pre-processing unit and a deep learning unit. The input of the pre-processing unit is coupled to a previous stage of the current sub neural network system 33 (the previous sub neural network system 33 or input unit 31), and the output of the pre-processing unit is coupled to the input of the deep learning unit. The output of the deep learning unit is coupled to the next stage of the current sub neural network system 33 (the next sub neural network system 33 or output unit 35). Herein, the pre-processing unit is for performing step S51 to step S53 or step S61 to step S63, and the deep learning unit is for performing step S54, step S54', step S64 or step S64'. In other words, the deep learning unit becomes the predictive model upon having performed deep learning. In another embodiment, the deep learning unit can include an input layer and multiple layers of hidden layers. The input layer is coupled between the previous stage (the previous sub neural network system 33 or input unit 31) and the hidden layers. Each hidden layer is coupled between the input layer and the next stage (the next sub neural network system 33 or output unit 35). Herein, steps S51 to step S53 or step S61 to step S63 can be performed by the input layer instead.

Figure 13:
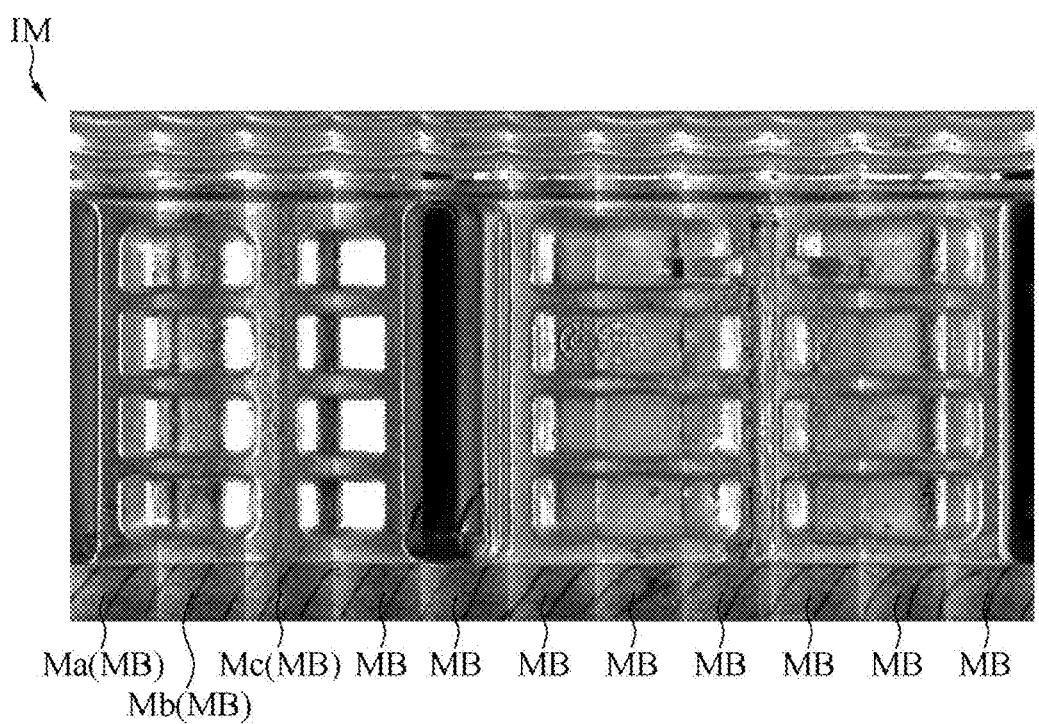
FIG. 13 is a schematic diagram of an exemplary object image.

In some embodiments, each object image IM is formed by combining a plurality of detection images MB (as shown in FIG. 13). Moreover, the image size of each region of interest is smaller than the image size of the detection image (the original image size).

Figure 14:
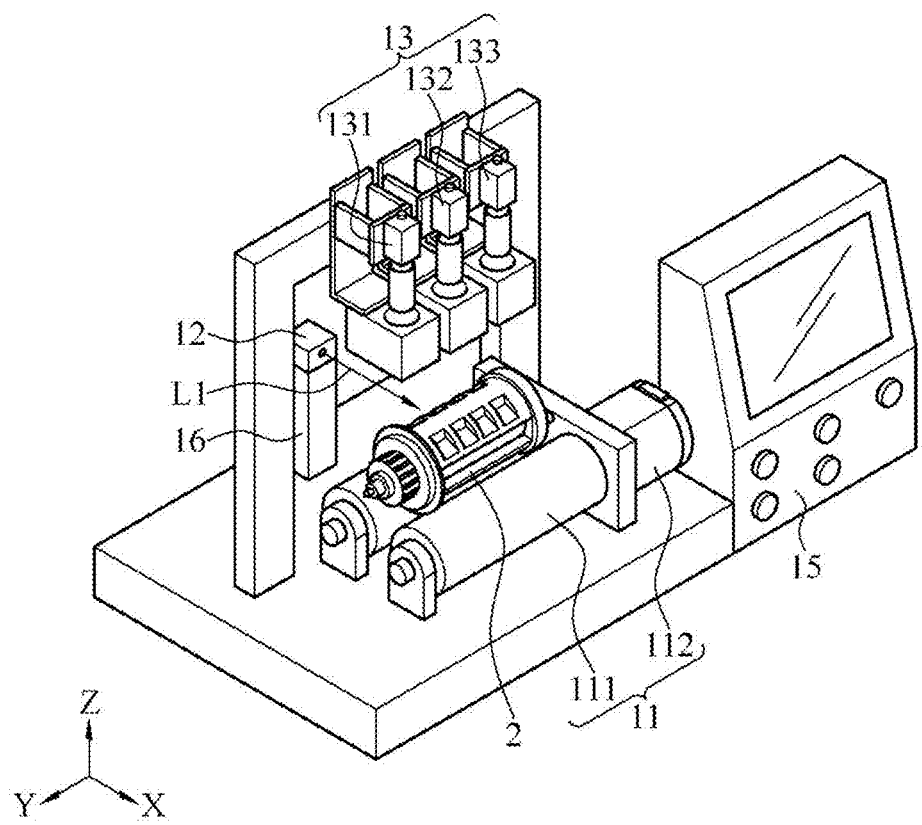
FIG. 14 is a schematic diagram of an image scanning system for a surface type of an object according to an embodiment of the present invention.

In some embodiments, each detection image MB can be generated by an image scanning system for a surface type of an object. Referring to FIG. 14, the image scanning system for a surface type of an object is suitable for scanning the object 2 to obtain at least one detection image MB of the object 2. Herein, the object 2 has the surface 21, and the surface 21 of the object 2 is divided along an extension direction D1 of the surface 21 of the object 2 into a plurality of areas 21A to 21C. In some embodiments, assuming that the surface 21 of the object 2 is divided into nine areas for example, three exemplary areas 21A to 21C are denoted in the drawings. However, the present invention is not limited to the above example. The surface 21 of the object 2 can also be divided into areas of other quantities according to actual requirements, for example, any quantity such as 3, 5, 11, 15 or 20.

Referring to FIG. 14 to FIG. 17, FIG. 16 and FIG. 17 show two implementations of relative optical positions of the object 2, the light source component 12 and the photosensitive element 13 in FIG. 14.

The image scanning system for a surface type of an object includes a driver component 11, the light source component 12 and the photosensitive element 13. The light source component 12 and the photosensitive element 13 face a detection position 14 on the driver component 11 by different angles.

The image scanning system can perform a detection procedure. In the detection procedure, the driver component 11 carries the object 2 under detection and sequentially moves one of the plurality of areas 21A to 21C to the detection position 14, and the light source component 12 emits light L1 toward the detection position 14, so as to sequentially illuminate the areas 21A to 21C located at the detection position 14. Thus, the areas 21A to 21C are sequentially provided at the detection position 14, and receive illumination of the light L1 from a lateral or inclined direction when they are located at the detection position 14.

In some embodiments, when each of the areas 21A to 21C is located at the detection position 14, the photosensitive element 13 receives diffused light generated by the light received on the areas currently located at the detection position 14, and captures, according to the diffused light received, detection images of the areas currently located at the detection position 14.

For example, in the detection procedure, the driver component 11 first moves the area 21A to the detection position 14, and the photosensitive element 13 captures, as the area 21A is illuminated by the detection light L1 provided by the light source component 12, a detection image Ma of the area 21A. Next, the driver component 11 moves object 2 to locate the area 21B to the detection position 14, and the photosensitive element 13 captures, as the area 21B is illuminated by the detection light L1 provided by the light source component 12, a detection image Mb of the area 21B. Next, the driver component 11 moves the object 2 to locate the area 21C to the detection position 14, and the photosensitive element 13 captures, as the area 21C is illuminated by the detection light L1 provided by the light source component 12, a detection image Mc of the area 21C. The above is repeated similarly, until the detection images MB of all areas have been captured.

In some embodiments, an included angle (to be referred to as a light incident angle θ hereinafter) between the light incident direction of the light L1 and a normal line 14A of each of the areas 21A to 21C located at the detection position 14 is more than 0 degree and less than or equal to 90 degrees. That is to say, the light L1 (i.e., an incident optical axis thereof) illuminates the detection position 14 with the light incident angle θ of being more than 0 degree and less than or equal to 90 degrees relative to the normal line 14A.

Figure 18:
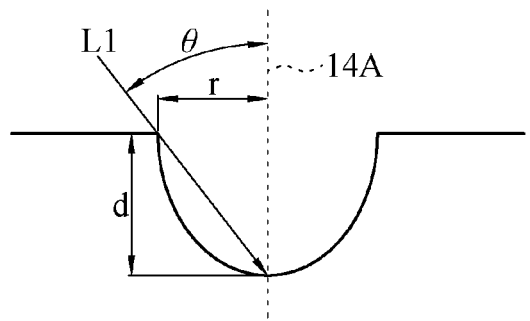
FIG. 18 is a schematic diagram of an implementation of a surface type.

In some embodiments, the light incident angle θ can be more than or equal to a critical angle and less than or equal to 90 degrees, so as to achieve optimal effects of capturing target features under the wavelength at which detection is to be performed. Herein, the critical angle can be associated with the surface type expected to be detected. In some embodiments, the light incident angle θ is associated with an aspect ratio of a surface type expected to be detected. Herein, the surface type expected to be detected can be a surface type having a minimum size among the surface types that the user expects to be detected. In some embodiments, the critical angle can be an arctangent (r/d), wherein d is a hole depth of a surface type expected to be detected, and r is a hole radius of a surface type expected to be detected. For instance, referring to FIG. 18, take a surface type as a defect having a hole depth d and a hole radius r for example. Herein, the hole radius r is the distance between any lateral surface within the defect and the normal line 14A, and a ratio (r/d) of the hole radius r to the hole depth d is the aspect ratio (r/d) of the defect. At this point, the light incident angle θ is more than or equal to the arctangent (r/d) and less than or equal to 90 degrees.

Figure 16:
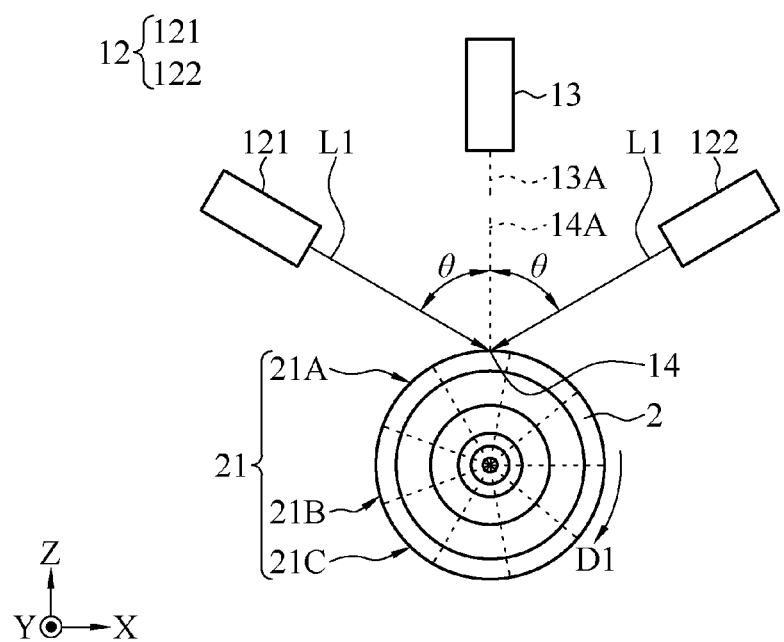
FIG. 16 is a schematic diagram of a first implementation of relative optical positions of the object, the light source component and the photosensitive element in FIG. 14.
Figure 17:
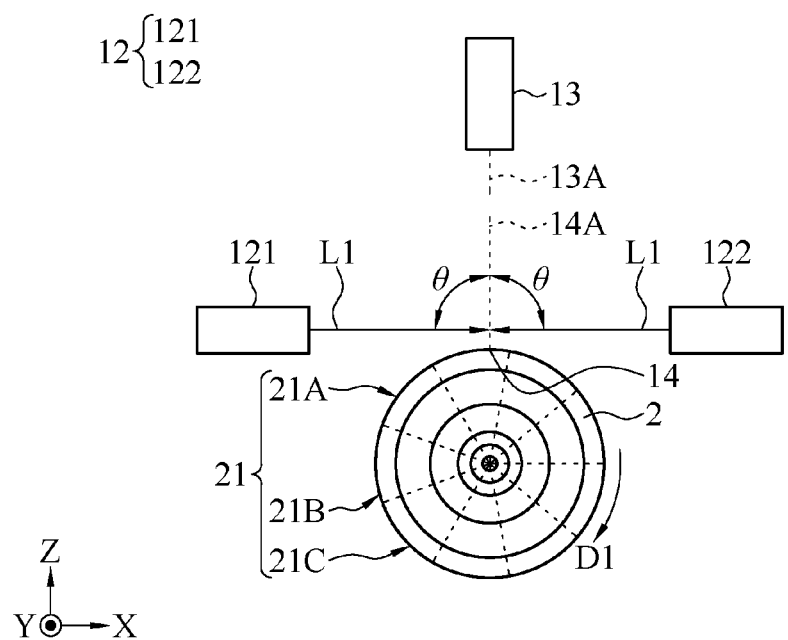
FIG. 17 is a schematic diagram of a second implementation of relative optical positions of the object, the light source component and the photosensitive element in FIG. 14.
Figure 19:
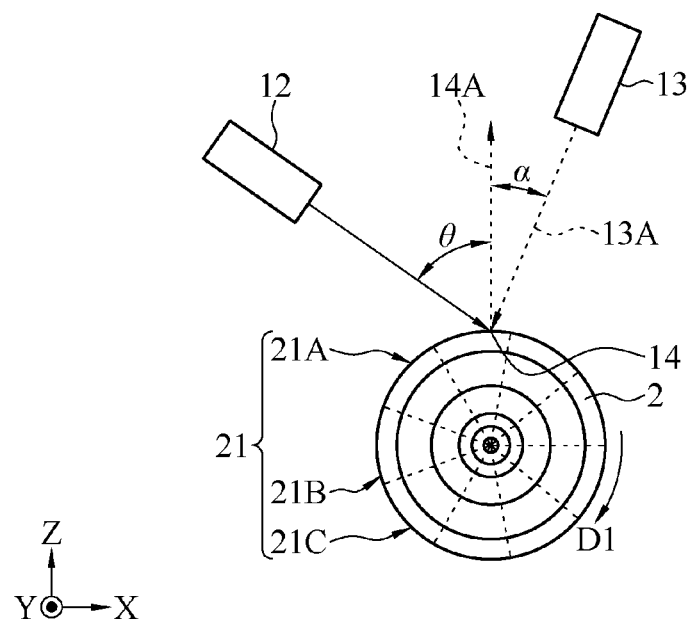
FIG. 19 is a schematic diagram of a third implementation of relative optical positions of the object, the light source component and the photosensitive element in FIG. 14.

In some embodiments, a photosensitive axis 13A of the photosensitive element 13 is parallel to the normal line 14A or between the normal line 14A and the tangent of the area of the object 2 located at the detection position 14, as shown in FIG. 16, FIG. 17 and FIG. 19. In one example, the photosensitive axis 13A of the photosensitive element 13 is parallel to the normal line 14A, as shown in FIG. 16 and FIG. 17. In another example, an included angle (to be referred to as a light reflection angle α hereinafter) is present between the photosensitive axis 13A of the photosensitive element 13 and the normal line 14A, as shown in FIG. 19. In some embodiments, the light reflection angle α is not equal to the light incident angle θ, so as to minimize generation of glare and to further obtain a clearer detection image MB.

In some embodiments, the light wavelength of the light L1 provided by the light source component 12 can range between 300 nm and 3,000 nm. For example, the light wavelength of the light L1 can be within a light waveband of 300 nm to 600 nm, 600 nm to 900 nm, 900 nm to 1,200 nm, 1,200 nm to 1,500 nm, 1,500 nm to 1,800 nm, or 1,800 nm to 2,100 nm. In one example, the light L1 provided by the light source component 12 can be visible light, allowing an image of a surface type in a scale of micron (μm) on the surface 21 to form in the detection image MB. In one embodiment, the light wavelength of the light L1 can range between 380 nm and 780 nm, and can be determined according to requirements of the material properties and surface spectral reflectivity of the object under detection. In some embodiments, the visible light can be any one of white light, violet light, blue light, green light, yellow light, orange light and red light. For example, the light L1 can be white light having a light wavelength ranging between 380 nm and 780 nm, blue light having a light wavelength ranging between 450 nm and 475 nm, green light having a light wavelength ranging between 495 nm and 570 nm, or red light having a light wavelength ranging between 620 nm and 750 nm.

In another embodiment, the light L1 provided by the light source component 12 can be far infrared light (for example, having a light wavelength thereof ranging between 800 nm and 3,000 nm). Thus, the detection light can allow an image of a surface type in a scale of submicron (e.g., 300 nm) on the surface of the object 2 to form in the detection image. In one example, when far infrared light is provided by the light source component 12 to illuminate light in an inclined direction on the object 2 having a surface attachment, the far infrared light is capable of passing through the surface of the object 2, enabling the photosensitive element 13 to capture the surface image of the object 2 below the attachment. In other words, the far infrared light is capable of passing through the surface attachment of the object 2, enabling the photosensitive element 13 to obtain an image of the surface 21 of the object 2. In some embodiments, the light wavelength of the far infrared light is more than 2 μm. In some embodiments, the light wavelength of the far infrared light is more than the thickness of the attachment. In other words, the light wavelength of the far infrared light can be selected according to the thickness of an attachment needing to be passed through. In some embodiments, the light wavelength of the far infrared light can also be selected according to the surface type of the object under detection, thereby performing image filtering for micron (μm) structures. For example, if the surface of a sample has a small and long scratch or sand hole of 1 μm to 3 μm, which however does not affect the product quality, and structural defects that quality control staff are concerned about are structural defects more than 10 μm, the wavelength of the far infrared light L1 selected can be an intermediate wavelength (e.g., 4 μm) so as to achieve optimal filtering effects for image fine structures and low-noise image quality without affecting the detection for defects in larger sizes. Preferably, the light wavelength of the far infrared light is more than 3.5 μm. In some embodiments, the object 2 is preferably a metal material. In some embodiments, the attachment can be grease, stains, or color paint.

Figure 20:
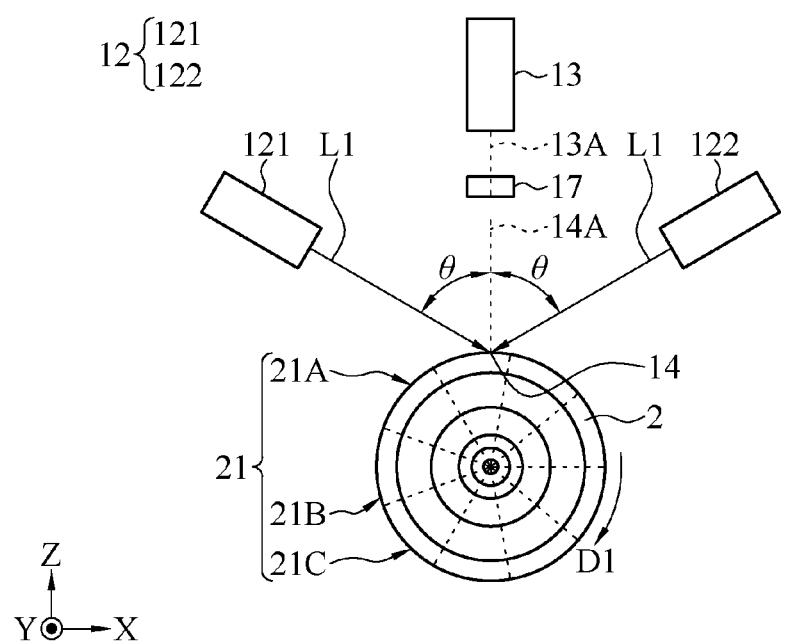
FIG. 20 is a schematic diagram of a fourth implementation of relative optical positions of the object, the light source component and the photosensitive element in FIG. 14.

In some embodiments, referring to FIG. 20, the image scanning system for the surface type of an object can further include a polarizing plate 17. The polarizing plate 17 is located on the optical axis 13A of the photosensitive element 13 and is configured between the photosensitive element 13 and the detection position 14. Herein, the photosensitive element 13 performs image capturing of the surface of the object 2 though the polarizing plate 17. Herein, with the polarization filtering of the polarizing plate 17, saturation glare caused upon the photosensitive element 13 due to strong far infrared light can be effectively prevented, thereby improving the quality of detection images and hence obtaining low-disturbance penetrating images.

Figure 15:
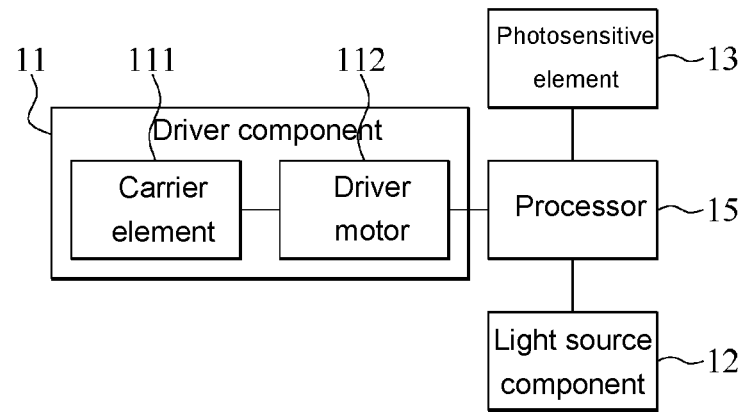
FIG. 15 is a function schematic diagram of a first implementation of an image scanning system for a surface type of an object.

In some embodiments, referring to FIG. 14 and FIG. 15, the driver component 11 includes a carrier element 111 and a driver motor 112 connected to the carrier element 111. In the detection procedure, the carrier element 111 carries the object 2, and the driver motor 112 drives the carrier element 111 to drive the object 2 such that an area is aligned to the detection position 14. In one embodiment, as shown in FIG. 14, FIG. 16, FIG. 17, FIG. 19 and FIG. 20, the object 2 can be cylindrical in shape, for example, a spindle. Herein, the surface 21 of the object 2 can be a lateral surface of the body of the object 2, that is, the surface 21 is a cylindrical surface and has a radian of 27r. Herein, the extension direction D1 can be a clockwise direction or a counterclockwise direction with respect to the long axis of the body of the object 2 as a rotation axis. In some embodiments, one end of the object 2 is a narrower and smaller structure compared to the other end. In one example, the carrier element 111 can be two rollers spaced by a predetermined distance, and the driver motor 112 is coupled to rotating shafts of the two rollers. Herein, the predetermined distance is less than the diameter of the object 2 (the minimum diameter of the body). Thus, in the detection procedure, the object 2 can be movably arranged between the two rollers. Furthermore, while the driver motor 112 rotates the two rollers, the object 2 is driven and hence rotated by the two rollers due to the surface frictional force between the object 2 and the two rollers, such that the object 2 is rotated along the extension direction D1 of the surface 21 to align an area to the detection position 14. In another example, the carrier element 111 can be a rotating shaft, and the driver motor 112 is coupled to one end of the rotating shaft. At this point, the other end of the rotating shaft has an embedding member (e.g., an insertion hole). At this point, in the detection procedure, the object 2 is removably embedded in the embedding member. Furthermore, while the driver motor 112 rotates the rotating shaft, the object 2 is driven by the rotating shaft and is rotated along the extension direction D1 of the surface 21, thus aligning an area to the detection position 14. In some embodiments, assuming that the surface 21 is divided into nine areas 21A to 21C for example, the driver motor 112 drives the carrier element 111 to rotate by 40 degrees each time, such that the object 2 is driven to rotate along the extension direction D1 of the surface 21 by 40 degrees.

Figure 21:
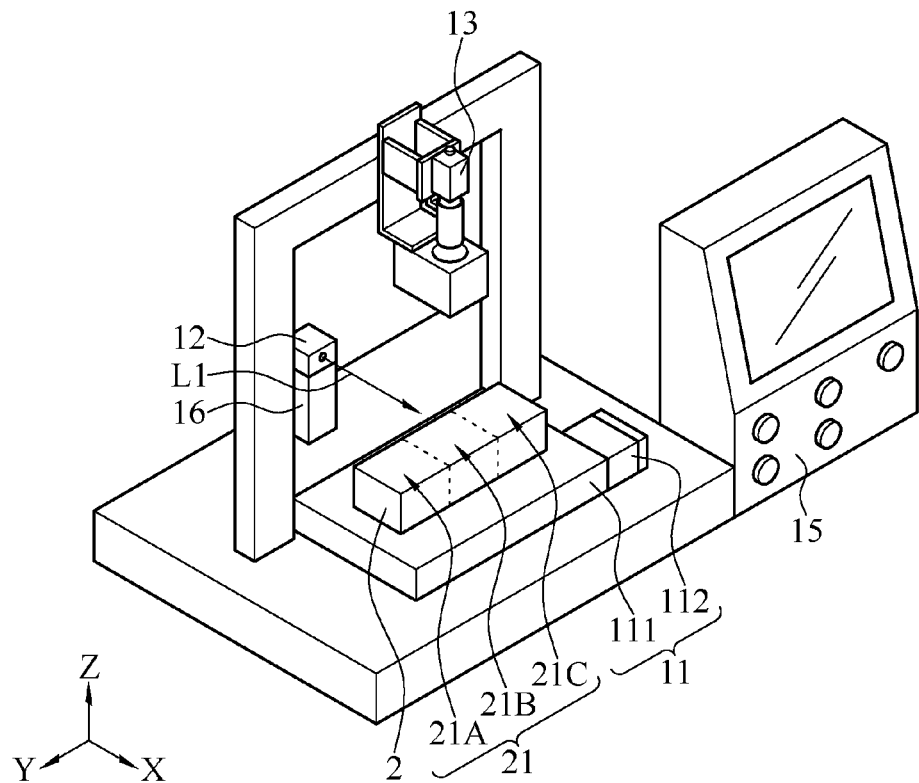
FIG. 21 is a schematic diagram of an image scanning system for a surface type of an object according to another embodiment of the present invention.

In one embodiment, as shown in FIG. 21, the object 2 is plate-like in shape. The surface 21 of the object 2 is a non-curved surface having a curvature of being equal to zero or approximately equal to zero. Herein, the extension direction D1 can be an extension direction of any side (e.g., the long side) of the surface 21 of the object 2. In one example, the carrier element 111 can be a planar carrier plate, and the driver motor 112 is coupled to one side of the planar carrier plate. At this point, in the detection procedure, the object 2 can be removably arranged on the planar carrier plate. The driver motor 112 drives the planar carrier plate to move along the extension direction D1 of the surface 21 so as to drive and move the object 2, thus aligning an area to the detection position 14. Herein, the driver motor 112 drives the planar carrier plate to move by a predetermined distance each time, and sequentially moves each of the areas 21A to 21C to the detection position 14 by repeatedly driving the planar carrier plate. Herein, the predetermined distance is substantially equal to the width of each of the areas 21A to 21C along the extension direction D1.

In some embodiments, the driver motor 112 can be a step motor.

Figure 22:
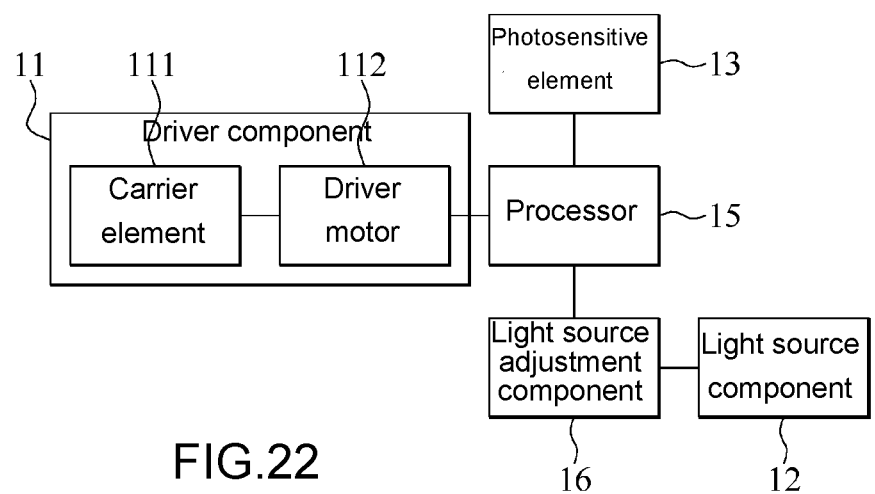
FIG. 22 is a function schematic diagram of a second implementation of an image scanning system for a surface type of an object.

In some embodiments, referring to FIG. 14, FIG. 21 and FIG. 22, the image scanning system can further include a light source adjustment component 16, and the light source adjustment component 16 is coupled to the light source component 12. Herein, the light source adjustment component 16 can be used for adjusting the position of the light source component 12 so as to change a light incident angle α.

In some embodiments, the value of the light incident angle θ and the brightness presented by a surface defect in a detection image have a negative correlation relationship. As the light incident angle θ gets smaller, a shallower surface type presents a brighter image in a detection image MB; that is to say, in a situation where the light incident angle θ is smaller, it become more difficult for the image scanning system or the inspector to identify a shallower surface type. It is easier for the image scanning system or the inspector to identify a deeper surface type according to a darker image. Conversely, as the light incident angle becomes larger, both a deeper surface defect and a shallower surface defect present darker images in a detection image; that is to say, the image scanning system or the inspector is capable of identifying all surface types in a situation where the light incident angle θ is larger.

In one example, if detection for a predetermined deeper surface type but not a predetermined shallower surface type is desired, the light source adjustment component 16 can adjust the position of the light source component 12 according to the light incident angle θ calculated by using the described negative correlation relationship and thus set a smaller light incident angle α. At this point, the light source adjustment component 16 drives the light source component 12 to output the light L1, such that the predetermined shallower surface type presents a brighter image in the detection image and the predetermined deeper surface type presents a darker image in the detection image. If detection for both predetermined shallower and deeper surface types is desired, the light source adjustment component 16 can adjust the position of the light source component 12 according to the light incident angle θ calculated by using the described negative correlation relationship and thus set a larger light incident angle θ (e.g., 90 degrees). At this point, the light source adjustment component 16 drives the light source component 12 to output the detection light L1, such that the predetermined shallower and deeper surface types both present shadows in the detection image.

In some embodiments, the light source adjustment component 16 can sequentially adjust the position of the light source component 12, such that the photosensitive element 13 capture the detection images MB of the object 2 respectively under different light incident angles θ.

Figure 23:
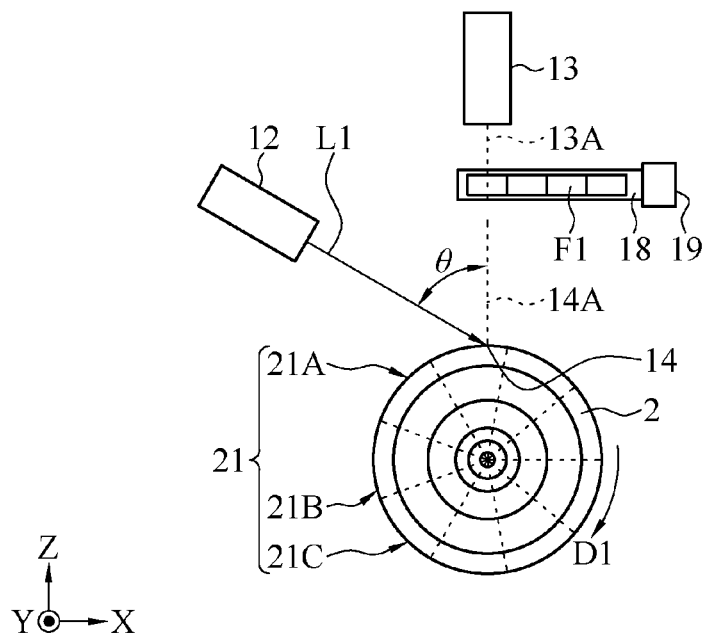
FIG. 23 is a schematic diagram of a fifth implementation of relative optical positions of the object, the light source component and the photosensitive element in FIG. 14.
Figure 24:
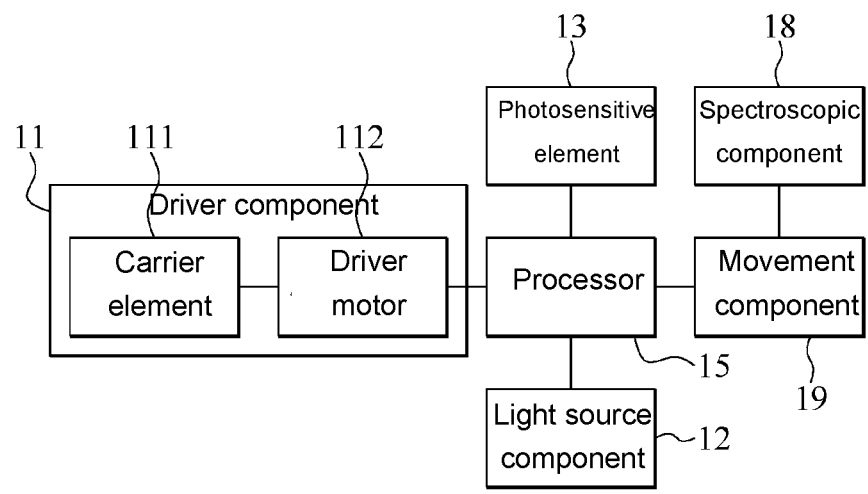
FIG. 24 is a function schematic diagram of a third implementation of an image scanning system for a surface type of an object.

In some embodiments, referring to FIG. 23 and FIG. 24, the image scanning system can further include a spectroscopic component 18. The spectroscopic component 18 is located between the photosensitive element 13 and the detection position 14; alternatively speaking, spectroscopic component 18 is located between the photosensitive element 13 and the object 2. The spectroscopic component 18 has a plurality of filter regions F1 respectively corresponding to a plurality of spectra. At this point, the light source component 12 provides multi-spectrum light to illuminate the detection position 14. Herein, the multi-spectrum light has sub-light of a plurality of spectra. Thus, by switching the filter regions F1 of the spectroscopic component 18 (i.e., respectively moving the filter regions F1 onto the photosensitive axis 13A of the photosensitive element 13), the photosensitive element 13 is enabled to capture, through the filter regions F1, a detection image MB of the area (one of the areas 21A to 21C) located at the detection position 14, so as to obtain the detection image MB of multiple different spectra. That is to say, when the multi-spectrum light from the light source component 12 illuminates upon the object 2 at the detection position 14, the multi-spectrum light is diffused by the surface of the object 2, and the diffused light is filtered by any one of the filter regions F1 of the spectroscopic component 18 to become sub-light having a spectrum corresponding to the filter region F1 and then enters the sensing region of the photosensitive element 13. At this point, only one single spectrum (an intermediate value of a light waveband) remains in the sub-light arriving at the photosensitive element 13. When the same filter region F1 is aligned with the photosensitive axis 13A of the photosensitive element 13, the driver component 11 moves one area each time to the detection position 14, and the photosensitive element 13 captures once after each movement the detection image MB of the area currently located at the detection position 14, so as to obtain the detection images MB of all the areas 21A to 21C under the same spectrum. Then, the spectroscopic component 18 switches to and aligns another filter region F1 with the photosensitive axis 13A of the photosensitive element 13, and again sequentially moves the areas and captures the detection images MB of the areas. The steps above are repeated similarly to obtain the detection images MB having the spectra respectively corresponding to the filter regions F1. In other words, the light source component 12 can have a wider light waveband of light wavelengths, and by providing on a light absorbing path the spectroscopic component 18 allowing light of certain light wavebands to pass through, the photosensitive element 13 is provided with the reflection light of the light L1 of an expected light wavelength.

In some embodiments, referring to FIG. 23 and FIG. 24, the image scanning system can further include a movement component 19. The movement component 19 is coupled to the spectroscopic component 18. During the operation of the image scanning system, the movement component 19 sequentially moves one of the filter regions F1 of the spectroscopic component 18 to the photosensitive axis 13A of the photosensitive element 13.

In another embodiment, the spectroscopic component can be configured at a light incident end instead. In some embodiments, referring to FIG. 25 and FIG. 26, the image scanning system can further include a spectroscopic component 18'. The spectroscopic component 18' is located between the light source component 12 and the detection position 14; alternatively speaking, the spectroscopic component 18' is located between the light source component 12 and the object 2. The spectroscopic component 18' has a plurality of filter regions F1 respectively corresponding to a plurality of spectra. At this point, the light source component 12 provides multi-spectrum light to illuminate the detection position 14 through the spectroscopic component 18'. Herein, the multi-spectrum light has sub-light of a plurality of spectra. Thus, by switching the filter regions F1 of the spectroscopic component 18' (i.e., respectively moving the filter regions F1 to the optical axis of the light source component 12), the multi-spectrum light outputted from the light source component 12 is filtered by the filter region F1 of the spectroscopic component 18' into sub-light of a single spectrum, and then illuminated upon the object 2 at the detection position 14. At this point, the photosensitive element 13 can capture the detection image MB of a specific spectrum of the area (one of the areas 21A to 21C) located at the detection position 14. When the same filter region F1 is aligned with the optical axis of the light source component 12, the driver component 11 moves one area each time to the detection position 14, and the photosensitive element 13 captures once after each movement the detection image MB of the area currently located at the detection position 14, so as to obtain the detection images MB of all the areas 21A to 21C under the same spectrum. Then, the spectroscopic component 18' switches to and aligns another filter region F1 with the optical axis of the light source component 12, and again sequentially moves the areas and captures the detection images MB of the areas. The steps above are repeated similarly to obtain the detection images MB having the spectra respectively corresponding to the filter regions F1. In other words, the light source component 12 can have a wider light waveband of light wavelengths, and by providing on a light incident path the spectroscopic component 18' allowing light of certain light wavebands to pass through, the light L1 of an expected light wavelength is provided and illuminated upon the detection position 14.

Figure 25:
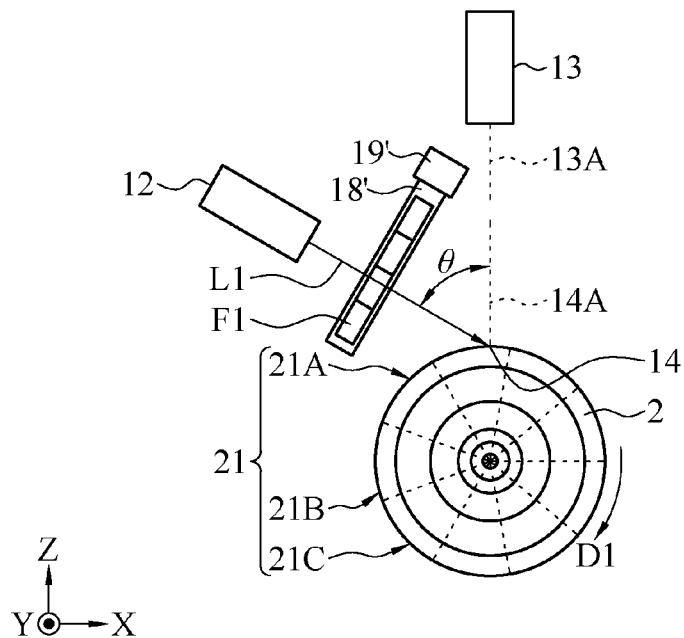
FIG. 25 is a schematic diagram of a sixth implementation of relative optical positions of the object, the light source component and the photosensitive element in FIG. 14.
Figure 26:
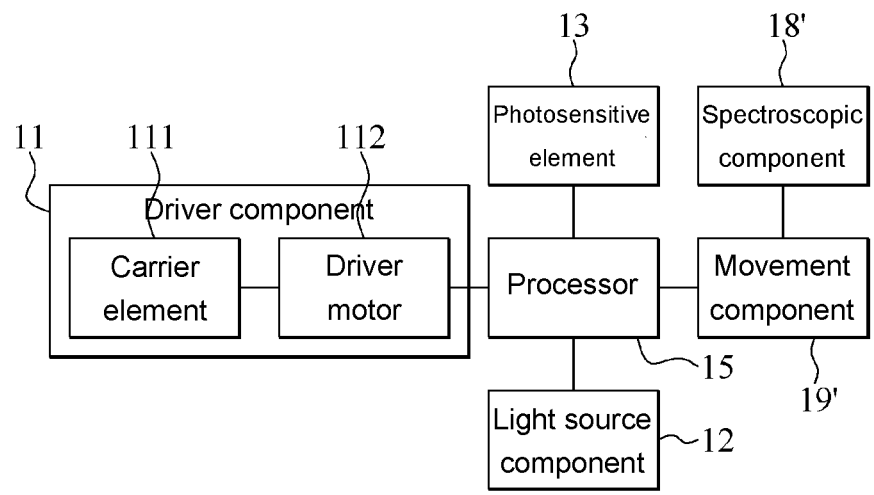
FIG. 26 is a function schematic diagram of a fourth implementation of an image scanning system for a surface type of an object.

In some embodiments, referring to FIG. 25 and FIG. 26, the image scanning system can further include a movement component 19'. The movement component 19' is coupled to the spectroscopic component 18'. During the operation of the image scanning system, the movement component 19' sequentially moves one of the filter regions F1 of the spectroscopic component 18' to the optical axis of the light source component 12.

In some embodiments, the light waveband of the multi-spectrum light provided by the light source component 12 can be between 300 nm and 2,100 nm, and the light wavebands individually allowed to pass through the multiple filter regions F1 of the spectroscopic component 18 (18') are respectively any non-overlapping sections between 300 nm and 2,100 nm. Herein, the light wavebands individually allowed to pass through the multiple filter regions F1 of the spectroscopic component 18 (18') can be continuous or discontinuous. For example, assuming that the light waveband of the multi-spectrum light is between 300 nm and 2,100 nm, the light wavebands individually allowed to pass through the multiple filter regions F1 of the spectroscopic component 18 (18') can be 300 nm to 600 nm, 600 nm to 900 nm, 900 nm to 1,200 nm, 1,200 nm to 1,500 nm, 1,500 nm to 1,800 nm, and 1,800 nm to 2,100 nm. In another example, assuming that the light waveband of the multi-spectrum light is between 380 nm and 750 nm, the light wavebands individually allowed to pass through the multiple filter regions F1 of the spectroscopic component 18 (18') can be 380 nm to 450 nm, 495 nm to 570 nm, and 620 nm to 750 nm.

In some embodiments, each spectrum above can be represented by a waveband of a single-color light or an intermediate value thereof.

In some embodiments, the spectroscopic component 18 (18') can be a spectrometer.

Figure 27:
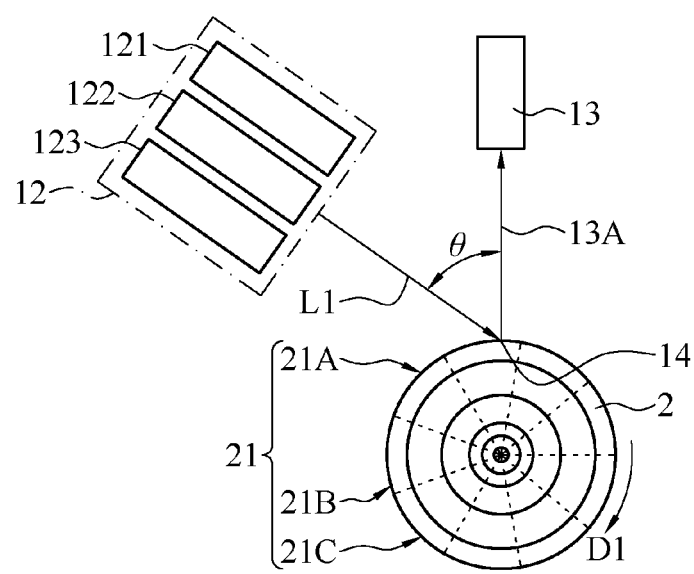
FIG. 27 is a schematic diagram of an exemplary detection image.

In some embodiments, referring to FIG. 27, the image scanning system can use multiple light emitting elements 121 to 123 of different spectra to provide the light L1 of a plurality of spectra, and the light emitting elements 121 to 123 of different spectra are sequentially actuated, enabling the photosensitive element 13 to obtain detection images of multiple different spectra. In other words, the light source component 12 includes the plurality of light emitting elements 121 to 123, and these light emitting elements 121 to 123 respectively correspond to multiple non-overlapping light wavebands. In some embodiments, the light wavebands can be continuous or discontinuous.

Figure 28:
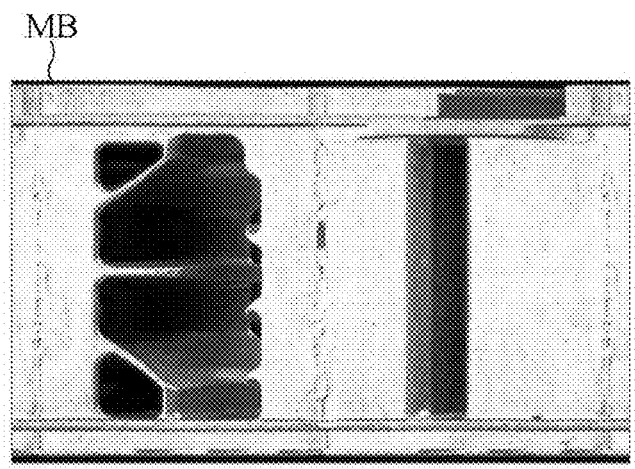
FIG. 28 is a schematic diagram of another exemplary detection image.
Figure 29:
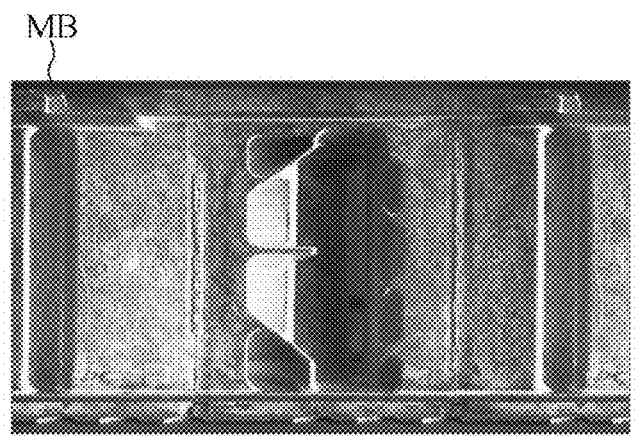
FIG. 29 is a schematic diagram of yet another exemplary detection image.

For example, the light source component 12 includes red LED, a blue LED and a green LED. When the red LED illuminates, the photosensitive element 13 can obtain a detection image MB of a red spectrum. When the blue LED illuminates, the photosensitive element 13 can obtain a detection image MB of a blue spectrum, as shown in FIG. 28. When the green LED illuminates, the photosensitive element 13 can obtain a detection image MB of a green spectrum, as shown in FIG. 29. Herein, details presented in the detection images MB under light of different wavebands are different. For example, grooves presented in the detection image MB under the blue spectrum are more apparent, and bumps presented in the detection image MB under the green spectrum are more apparent.

In one embodiment, as shown in FIG. 19, the light source component 12 can include one light emitting element. In another embodiment, as shown in FIG. 16, FIG. 17 and FIG.

20, the light source component 12 can include two light emitting elements 121 and 122, and the two light emitting elements 121 and 122 are symmetrically arranged on two opposite sides of the object 2 relative to the normal line 14A. The two light emitting elements 121 and 122 respectively illuminate the detection position 14 by light of the same light waveband, and the surface 21 is illuminated by the symmetrical detection light L1 and hence symmetrical diffused light is produced. Herein, the photosensitive element 13 captures the detection image MB of the area currently located at the detection position 14 according to the symmetrical diffused light, thus enhancing imaging quality of the detection image MB.

In some embodiments, each of the light emitting elements 121 and 122 can be implemented by one or more light emitting diodes (LED); in some embodiments, each of the light emitting elements 121 and 122 can be implemented by a laser light source.

In one embodiment, the object surface detection system can include one single light source component 12, as shown in 14 and FIG. 21.

Figure 30:
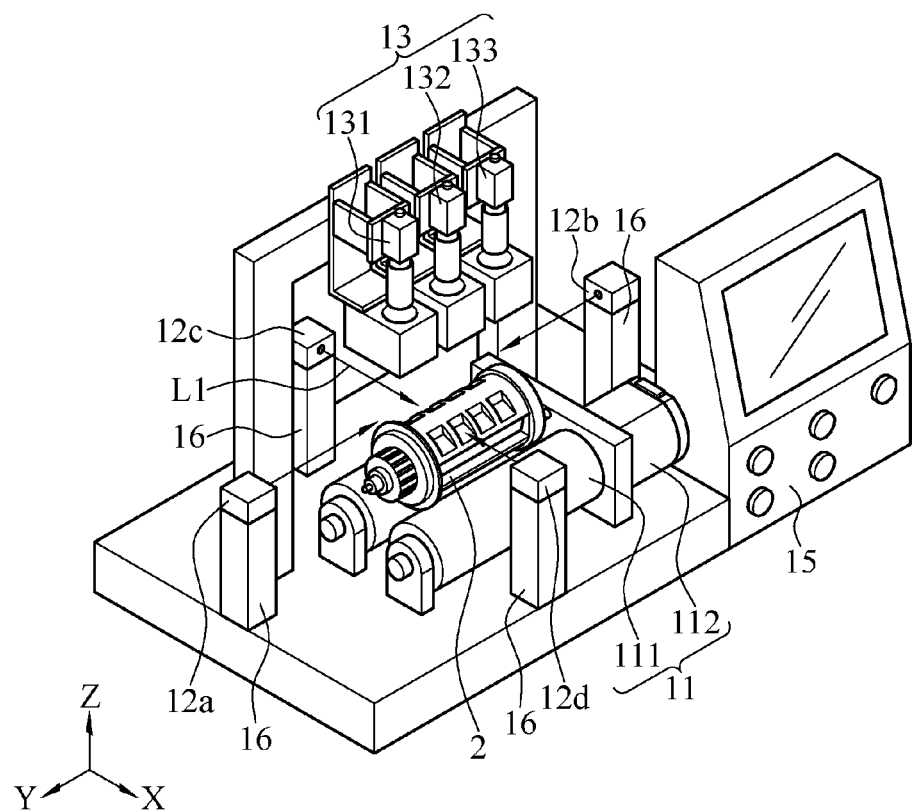
FIG. 30 is a function schematic diagram of a fifth implementation of an image scanning system for a surface type of an object.

In another embodiment, referring to FIG. 30, the object surface detection system can include multiple light source components 12a, 12b, 12c and 12d. The light source components 12a, 12b, 12c and 12d are respectively located in different directions from the detection position 14, that is, located in different directions from the carrier element 111 carrying the object 2. Thus, the object surface detection system can obtain object images having optimal spatial information of surface features. For example, assume that the object surface detection system includes four light source components 12a, 12b, 12c and 12d. The light source component 12a can be arranged on the front side of the detection position 14 (or the carrier element 111), the light source component 12b can be arranged on the rear side of the detection position 14 (or the carrier component 111), the light source component 12c can be arranged on the left side of the detection position 14 (or the carrier element 111), and the light source component 12d can be arranged on the right side of the detection position 14 (or the carrier component 111).

Herein, under the lighting of each light source component (any one of the light source components 12a, 12b, 12c and 12d), the object surface detection system performs the image capturing procedure once, so as to obtain the detection images MB of all the areas 21A to 21C of the object 2 under a specific lighting direction. For example, assume that the object surface detection system includes four light source components 12a, 12b, 12c and 12d. First, the object surface detection system emits the light L1 by the light source component 12a. Under the light L1 emitted from the light source component 12a, the photosensitive element 13 captures the detection images MB of all the areas 21A to 21C of the object 2. Then, the object surface detection system switches to the light source component 12b to emit the light L1. Under the light L1 emitted from the light source component 12b, the photosensitive element 13 similarly captures the detection images MB of all the areas 21A to 21C of the object 2. Next, the object surface detection system switches to the light source component 12c to emit the light L1. Under the light L1 emitted from the light source component 12c, the photosensitive element 13 similarly captures the detection images MB of all the areas 21A to 21C of the object 2. Next, the object surface detection system switches to the light source component 12d to emit the light L1. Under the light L1 emitted from the light source component 12d, the photosensitive element 13 similarly captures the detection images MB of all the areas 21A to 21C of the object 2.

In some embodiments, referring to FIG. 14, FIG. 15, FIG. 21, FIG. 22, FIG. 24, FIG. 26 and FIG. 30, the image scanning system can further include a processor 15. The processor 15 is coupled to the components (e.g., light source component 12, the photosensitive element 13, the driver motor 112, the light source adjustment component 16 and/or the movement components 19 and 19'), and is for controlling operations of the components (e.g., light source component 12, the photosensitive element 13, the driver motor 112, the light source adjustment component 16 and/or the movement components 19 and 19').

In some embodiments, upon having captured the detection images MB of all the areas 21A to 21C of the object 2 by the photosensitive element 13, the processor 15 can further combine the captured detection images MB into an object image IM according to a capturing sequence.

In one embodiment, the photosensitive element 13 can be a linear photosensitive element. At this point, the detection images MB captured by the photosensitive element 13 can be combined by the processor 15 without any cropping. In some embodiments, the linear photosensitive element can be implemented by a linear image sensor. Wherein, the linear image sensor can have a field of view (FOV) of approximating 0 degree.

Figure 31:
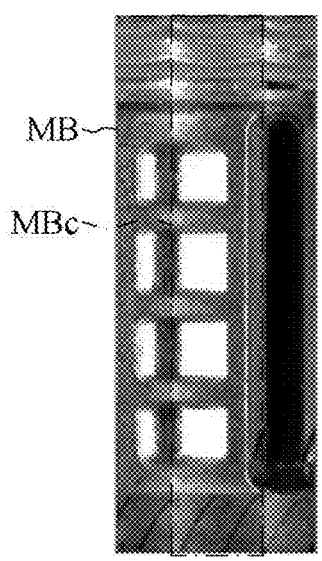
FIG. 31 is a schematic diagram of another exemplary object image.

In another embodiment, the photosensitive element 13 is a two-dimensional photosensitive element. At this point, upon having captured the detection images MB of all the areas 21A to 21C by the photosensitive element 13, the processor 15 captures, based on the short sides of the detection images MB, middle regions MBc of the detection images MB, as shown in FIG. 31. Then, the processor 15 combines the middle regions MBc corresponding to all the areas 21A to 21C into the object image IM. In some embodiments, the middle regions MBc can have a width of, for example, one pixel. In some embodiments, the two-dimensional photosensitive element can be implemented by a planar image sensor. Wherein, the planar image sensor can have a field of view of approximating 5 degrees to 30 degrees.

In one embodiment, referring to FIG. 21, the image scanning system can be provided with one single photosensitive element 13, and the photosensitive element 13 performs image capturing of multiple areas 21A to 21C so as to obtain multiple detection images respectively corresponding to the areas 21A to 21C. In another embodiment, referring to FIG. 14, the image scanning system can be provided with multiple photosensitive elements 13, and these photosensitive elements 13 face the detection position 14 and are arranged along the long axis of the object 2. These photosensitive elements 13 respectively capture detection images of areas located at the detection position 14 for different sections of the object 2.

In one example, assume that the object 2 is cylindrical in shape and the image scanning system is provided with one single photosensitive element 13. The photosensitive element 13 can perform image capturing of multiple areas 21A to 21C of the body (i.e., the middle section) of the object 2 to obtain multiple detection images MB respectively corresponding to the areas 21A to 21C, and the processor 15 then combines the detection images MB of the areas 21A to 21C into an object image IM, as shown in FIG. 13.

Figure 32:
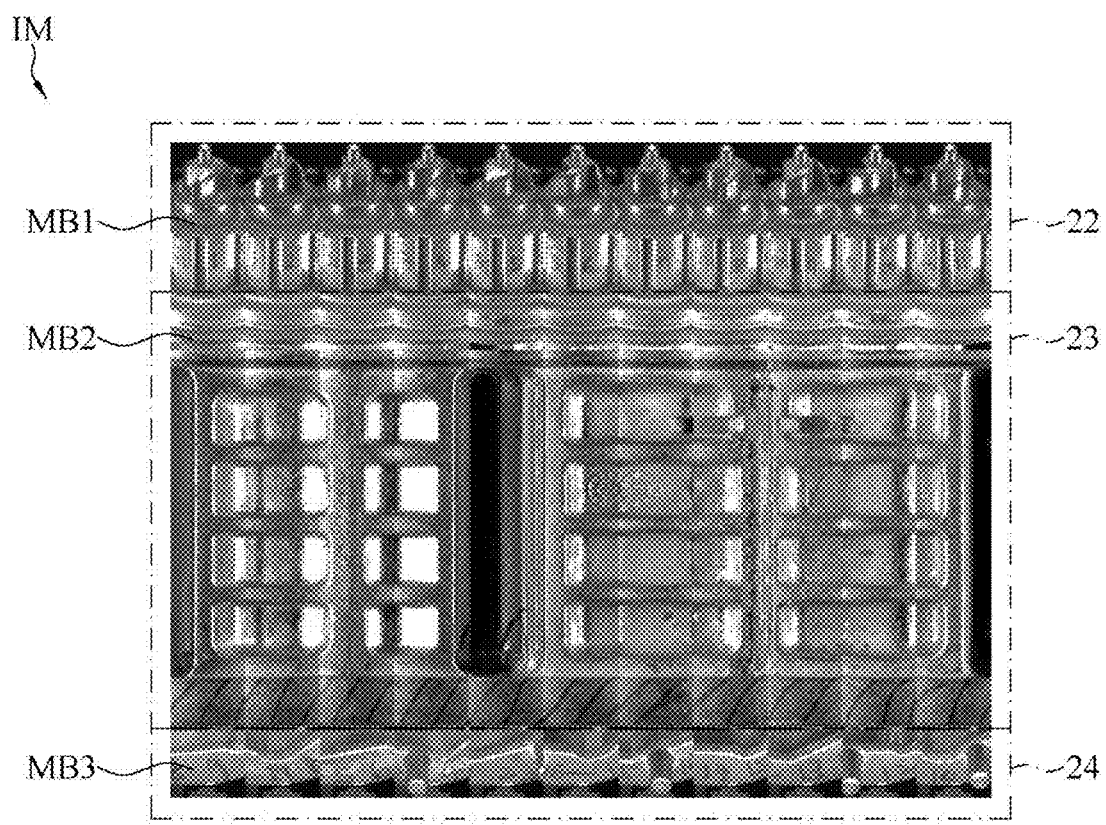
FIG. 32 is a schematic diagram of yet another exemplary object image.

In another example, assume that the object 2 is cylindrical in shape and the image scanning system is provided with multiple photosensitive elements 131 to 133, as shown in FIG. 14. These photosensitive elements 131 to 133 respectively capture detection images MB1 to MB3 of different section positions of the surface of the object 2 located at the detection position 14, and the processor 15 then combines all the detection images MB1 to MB3 into the object image IM, as shown in FIG. 32. For example, assume that the photosensitive elements 131 to 133 are in a quantity of three, and the processor 15 combines the detection images MB1 to MB3 captured by the three photosensitive elements 131 to 133 into the object image IM of the object 2, as shown in FIG. 27. Wherein, the object image IM includes a sub object image 22 (the upper part of the object image IM in FIG. 32) combined from the detection images MB1 of all the areas 21A to 21C captured by the first photosensitive element 131 among the three photosensitive elements 13, a sub object image 23 (the middle part of the object image IM in FIG. 32) combined from the detection images MB2 of all the areas 21A to 21C captured by the second photosensitive element 132 among the three photosensitive elements 13, and a sub object image 24 (the lower part of the object image IM in FIG. 32) combined from the detection images MB3 of all the areas 21A to 21C captured by the third photosensitive element 133 among the three photosensitive elements 13.

In some embodiments, the processor 15 can include the foregoing artificial neural network system 30, so as to have the artificial neural network system 30 automatically perform surface type categorization according to the combined object images IM, thereby automatically determining the surface type of the surface 21 of the object 2. In other words, in the learning phase, the object images IM generated by the processor 15 can be subsequently used for training of the sub neural network systems 33, so as to build the predictive models for identifying a surface type of an object. In the prediction phase, the object images IM generated by the processor 15 can be subsequently used for categorization prediction by the artificial neural network system 30, so as to perform categorization prediction on the object images IM by the respective predictive models of the sub neural network systems 33.

In some embodiments, the object images IM generated by the processor 15 can be fed to another processor including the foregoing artificial neural network system 30, so as to have the artificial neural network system 30 automatically perform surface type categorization according to the combined object images IM, thereby automatically determining the surface type of the surface 21 of the object 2. In other words, in the learning phase, the sub neural network systems 33 automatically perform training with respect to the object images IM fed in, and are cascaded into the artificial neural network system 30. In the prediction phase, the artificial neural network system 30 automatically performs categorization prediction on the object images IM fed in.

For instance, in one example, if the object 2 is an unqualified object, the surface of the object 2 has one or more surface types that the artificial neural network system has already learned and attempts to capture, such that at least one sub neural network system 33 then selects these surface types; conversely, if the object 2 is a qualified object, the surface of the object 2 does not possess any surface types that have been recorded and are used for triggering the selection action of the sub neural network system 33. In the learning phase, among the object images IM received by the individual sub neural network system 33, some have labels of one or more surface types, and others have labels without any surface types. Furthermore, the output of the sub neural network system 33 sets a plurality of surface type categories according to these surface types in advance. In another example, if the object 2 is an unqualified object, the surface of the object 2 has one or more first-type surface types that the artificial neural network has already learned and attempts to capture; conversely, if the object 2 is a qualified object, the surface of the object 2 has one or more second-type surface types that one or more other artificial neural networks have already learned and attempt to capture, wherein the second-type surface type can be, for example, a standard surface type. In the learning phase, among the object images IM received by the sub neural network system 33, some have labels of categories with one or more first-type surface types, and others have labels of categories with one or more second-type surface types. Furthermore, the output of the sub neural network system 33 sets a plurality of surface type categories according to these surface types in advance.

Figure 33:
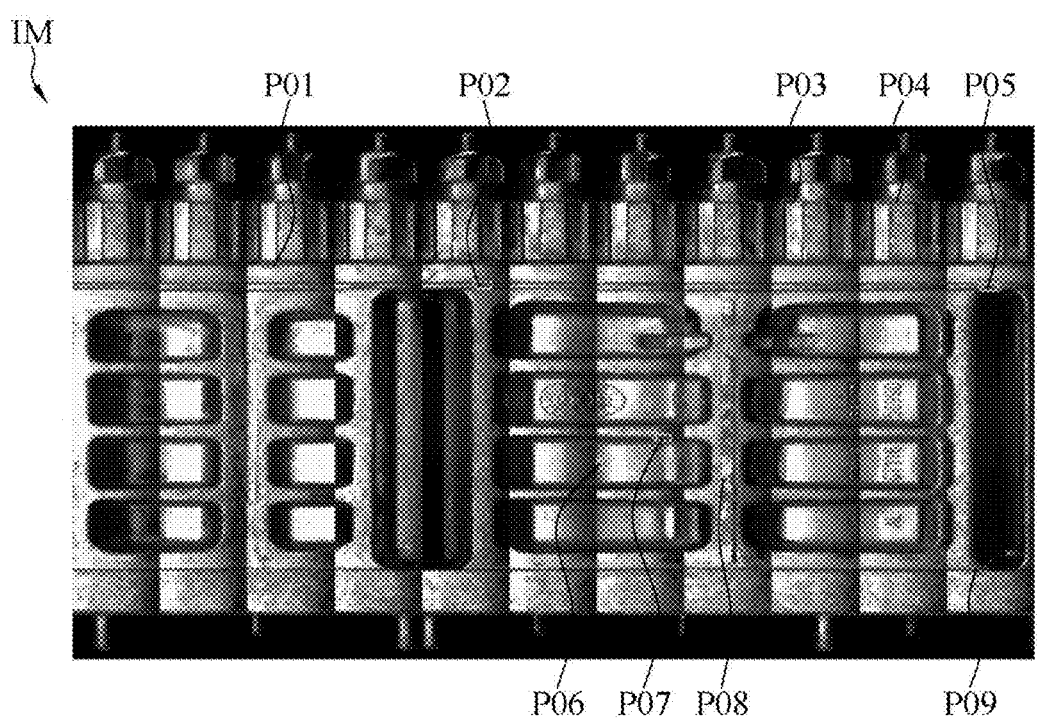
FIG. 33 is a schematic diagram of a further exemplary object image.

Referring to FIG. 33, when the surface of the object 2 has at least one surface type, partial images P01 to P09 presenting the surface type are also shown at corresponding positions in the object image IM of the object.

In some embodiments, in the learning phase, the object images IM received by the individual sub neural network system 33 are known surface types (i.e., an existing target surface type labeled thereon), and the surface type categorizes outputted by the individual sub neural network system 33 are also set in advance. In other words, each object image IM used for performing deep learning is labeled with an existing object type. In some embodiments, the label of the category of the object type can present a label pattern on the object image IM (as shown in FIG. 33), and/or record object information in image information of the object image IM.

In some embodiments, in the learning phase, each sub neural network system 33 uses the object images IM with known surface types to perform training, so as to generate determination items of each neuron in the predictive model and/or adjust a weighting connecting any neurons, such that a prediction result (i.e., a surface defect category outputted) of each object image IM matches a known surface type that is labeled as learned, thereby building a predictive model for identifying a surface type of an object. In the prediction phase, each sub neural network system 33 can perform category prediction on the object images IM with unknown surface types by using the predictive model built. In some embodiments, each sub neural network system 33 performs percentile prediction on the object images IM according to surface type categories, i.e., predicting the percentage of the possibility that each object image IM falls into the individual surface type categories. Then, each sub neural network system 33 sequentially determines according to the percentage of the object image IM with respect to each surface type category whether the corresponding object 2 qualifies, and categories the object image IM to the normal group or the abnormal group according to whether the object 2 qualifies.

In some embodiments, the artificial neural network-based method for selecting a surface type of an object according to the present invention can be implemented by a computer program product, such that the artificial neural network-based method for selecting a surface type of an object according to any embodiment of the present invention can be completed when a computer (i.e., a processor thereof) loads and executes the program. In some embodiments, the computer program product is a non-transitory computer-readable recording medium, and the program above is stored in the non-transitory computer-readable recording medium and to be loaded by a computer (i.e., a processor thereof). In some embodiments, the program above itself can be a computer program product, and is transmitted by a wired or wireless means into a computer.

In conclusion, the artificial neural network-based method for selecting a surface type of an object according to the embodiment of the present invention continually performs surface type identification on an object image by using multiple cascaded neural networks of different training conditions so as to accurately and rapidly categorize the object image, and efficiently selects an object corresponding to the object image based on the categorization result of the object image, thereby achieving a lower miss rate. In some embodiments, the artificial neural network-based method for selecting a surface type of an object according to embodiments of the present invention can achieve a miss rate approximating zero.

What is claimed is:

1. An artificial neural network-based method for selecting a surface type of an object, comprising:
   receiving at least one object image;
   performing surface type identification on each of the at least object image by using a first predictive model to categorize the object image to one of a first normal group and a first abnormal group according to the presence of surface defects, wherein object images with surfaces defects are categorized to the first abnormal group and object images without surfaces defects are categorized to the first normal group; and
   performing surface type identification on an output image of the first normal group by using a second predictive model to categorize the output image of the first normal group to one of a second normal group and a second abnormal group according to the presence of surface defects, wherein object images with surfaces defects are categorized to the second abnormal group and object images without surfaces defects are categorized to the second normal group.

2. The artificial neural network-based method for selecting a surface type of an object according to claim 1, further comprising:
   performing deep learning by using different training conditions to respectively build the first predictive model and the second predictive model.

3. The artificial neural network-based method for selecting a surface type of an object according to claim 1, further comprising:
   transforming the at least one object image into at least one matrix;
   wherein the step of performing the surface type identification on each of the at least one object image executes the first predictive model by using the at least one matrix.

4. The artificial neural network-based method for selecting a surface type of an object according to claim 1, further comprising:
   normalizing the at least one object image; and
   transforming the normalized at least one object image into the at least one matrix;
   wherein the step of performing the surface type identification on each of the at least one object image executes the first predictive model by using the at least one matrix.

5. The artificial neural network-based method for selecting a surface type of an object according to claim 1, further comprising:
   dividing each of the at least one object image into a plurality of image areas; and
   designating at least one region of interest from the plurality of image areas of each of the at least one object image;
   wherein the step of performing the surface type identification on each of the at least one object image by using the first predictive model comprises: executing the first predictive model by using the at least one region of interest of each of the at least one object image.

6. The artificial neural network-based method for selecting a surface type of an object according to claim 1, wherein the at least one object image comprises a plurality of object images obtained by capturing an object based on light from different lighting directions; the method further comprising:
   superimposing the plurality of object images of the object into an initial image;
   wherein the step of performing the surface type identification on each of the at least one object image by using the first predictive model comprises: executing the first predictive model by using the initial image.

7. The artificial neural network-based method for selecting a surface type of an object according to claim 1, wherein the output image of the first normal group comprises at least one of the at least one object image; the method further comprising:
   transforming each object image in the first normal group into a matrix;
   wherein the step of performing the surface type identification on the output image of the first normal group by using the second predictive model comprises executing the second predictive model by using the transformed matrix.

8. The artificial neural network-based method for selecting a surface type of an object according to claim 1, wherein the output image of the first normal group comprises at least one of the at least one object image; the method further comprising:
   normalizing each object image in the first normal group; and
   transforming each normalized object image into a matrix;
   wherein the step of performing the surface type identification on the output image of the first normal group by using the second predictive model comprises executing the second predictive model by using the transformed matrix.

9. The artificial neural network-based method for selecting a surface type of an object according to claim 1, wherein the output image of the first normal group comprises at least one of the at least one object image; the method further comprising:
   dividing each of the at least one object image in the first normal group into a plurality of image areas;
   designating at least one region of interest from the plurality of image areas of each of the at least one object image;
   wherein the step of performing the surface type identification on the output image of the first normal group by using the second predictive model comprises: executing the second predictive model by using the at least one region of interest of each of the at least one object image.

10. The artificial neural network-based method for selecting a surface type of an object according to claim 1, wherein the output image of the first normal group comprises, among the least one object image, a plurality of object images obtained by capturing an object based on light from different lighting directions; the method further comprising:
    superimposing the plurality of object images of the object into an initial image;
    wherein the step of performing the surface type identification on the output image of the first normal group by using the second predictive model comprises: executing the second predictive model by using the initial image.

11. The artificial neural network-based method for selecting a surface type of an object according to claim 1, wherein the first predictive model is implemented by a convolutional neural network (CNN) algorithm.

12. The artificial neural network-based method for selecting a surface type of an object according to claim 1, wherein the second predictive model is implemented by a convolutional neural network (CNN) algorithm.

13. The artificial neural network-based method for selecting a surface type of an object according to claim 1, wherein each of the at least one object image is formed by combining a plurality of detection images.

14. The artificial neural network-based method for selecting a surface type of an object according to claim 1, wherein the first predictive model and the second predictive model have different determination defect rates.

15. The artificial neural network-based method for selecting a surface type of an object according to claim 1, wherein the first predictive model and the second predictive model have neural network layers in different quantities.

16. The artificial neural network-based method for selecting a surface type of an object according to claim 1, wherein the first predictive model and the second predictive model have different neuron configurations.

\* \* \* \* \*